US012719593B2

(12) United States Patent
Manolakos et al.

(10) Patent No.: US 12,719,593 B2
(45) Date of Patent: Aug. 25, 2026

(54) FACTORS AFFECTING MEASUREMENT PERIOD FORMULATION FOR POSITIONING

(71) Applicant: QUALCOMM Incorporated, San Diego, CA (US)

(72) Inventors: Alexandros Manolakos, Escondido, CA (US); Mukesh Kumar, Hyderabad (IN); Srinivas Yerramalli, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 807 days.

(21) Appl. No.: 18/061,761

(22) Filed: Dec. 5, 2022

(65) Prior Publication Data

US 2023/0094358 A1 Mar. 30, 2023

Related U.S. Application Data

(63) Continuation of application No. PCT/US2022/070480, filed on Feb. 2, 2022.

(30) Foreign Application Priority Data

Mar. 26, 2021 (GR) .............................. 20210100190

(51) Int. Cl.
*H04B 17/309* (2015.01)
*H04B 17/336* (2015.01)
*H04W 64/00* (2009.01)

(52) U.S. Cl.
CPC ......... *H04B 17/309* (2015.01); *H04B 17/336* (2015.01); *H04W 64/003* (2013.01); *H04W 64/006* (2013.01)

(58) Field of Classification Search
CPC ..... H04W 64/00; H04W 24/10; H04W 4/029; H04W 64/003; H04W 4/02; H04W 64/006; H04W 4/025
See application file for complete search history.

(56) References Cited

U.S. PATENT DOCUMENTS 8,909,271 B2 12/2014 Stern-Berkowitz et al.
10,548,181 B2 1/2020 Siomina et al.
(Continued)

FOREIGN PATENT DOCUMENTS

CN 111756494 A 10/2020
EP 3751920 A1 12/2020
(Continued)

OTHER PUBLICATIONS

Fischer S., "Chapter 15: 5G NR Positioning: Fundamentals and Standards", In: "5G and Beyond: Fundamentals and Standards", Jan. 1, 2021 (Jan. 1, 2021), Springer International Publishing, Cham, XP055847961, pp. 429-483, ISBN: 978-3-030-58197-8, DOI: 10.1007/978-3-030-58197-8_15, Retrieved from the Internet: URL: http://link.springer.com/content/pdf/10.1007/978-3-030-58197-8_15, p. 464, First Paragraph to p. 467, Third Paragraph, paragraphs [0003]-[03.1] paragraph [03.3].
(Continued)

*Primary Examiner* — Kwasi Karikari
(74) *Attorney, Agent, or Firm* — Muncy, Geissler, Olds & Lowe, P.C.

(57) ABSTRACT

Disclosed are techniques for wireless positioning. In an aspect, a user equipment (UE) receives a request location information message from the network entity, the request location information message including one or more start measurement time parameters indicating a start time of a measurement period during which the UE is expected to perform one or more positioning measurements, and performs the one or more positioning measurements of one or
(Continued)

more positioning reference signal (PRS) resources on a first positioning frequency layer during the measurement period, wherein a start of the measurement period is based on the one or more PRS resources, a reception time, and the one or more start measurement time parameters.

23 Claims, 15 Drawing Sheets

(56) References Cited

U.S. PATENT DOCUMENTS

| | | | | |
|---|---|---|---|---|
| 10,834,733 | B2 | 11/2020 | Nagaraja et al. | |
| 10,863,473 | B2 | 12/2020 | Wong et al. | |
| 11,576,060 | B2 | 2/2023 | Manolakos et al. | |
| 12,085,637 | B2 | 9/2024 | Chen et al. | |
| 2013/0065612 | A1 | 3/2013 | Siomina et al. | |
| 2016/0286419 | A1 | 9/2016 | Liu et al. | |
| 2016/0295374 | A1 | 10/2016 | Persson et al. | |
| 2020/0107288 | A1 | 4/2020 | Kumar et al. | |
| 2020/0137715 | A1 | 4/2020 | Edge et al. | |
| 2021/0051623 | A1* | 2/2021 | Manolakos | G01S 5/0236 |
| 2021/0058890 | A1 | 2/2021 | Akkarakaran et al. | |
| 2021/0067382 | A1 | 3/2021 | Manolakos et al. | |
| 2021/0067990 | A1* | 3/2021 | Opshaug | G01S 5/0036 |
| 2021/0266859 | A1 | 8/2021 | Yu et al. | |
| 2022/0369270 | A1 | 11/2022 | Jiang et al. | |
| 2023/0345408 | A1* | 10/2023 | Thomas | H04W 64/00 |
| 2024/0015686 | A1 | 1/2024 | Rao et al. | |
| 2024/0089906 | A1 | 3/2024 | Manolakos et al. | |

FOREIGN PATENT DOCUMENTS

| | | | |
|---|---|---|---|
| KR | 20120053941 | A | 5/2012 |
| WO | 2018144247 | A1 | 8/2018 |
| WO | 2020159339 | A1 | 8/2020 |
| WO | 2020204646 | A1 | 10/2020 |
| WO | WO-2020221008 | A1 | 11/2020 |
| WO | WO-2020242755 | | 12/2020 |

OTHER PUBLICATIONS

International Search Report and Written Opinion—PCT/US2022/070480—ISA/EPO—May 18, 2022.

U.S. Appl. No. 63/130,037, filed Dec. 23, 2020, 50 Pages (Specification).

Lenovo, et al., "Considerations for Positioning Latency Evaluation", [online], [text], 3GPP TSG RAN WG1#102-e, R1-2006323, e-Meeting, Aug. 17-Aug. 28, 2020, Aug. 28, 2020, pp. 1-6.

Qualcomm Incorporated: "On PRS-RSTC Measurements in NR Positioning", [online], [text], 3GPP TSG-RAN WG4 Meeting #96-e, R4-2009874, Online, Aug. 17-Aug. 28, 2020, Aug. 28, 2020, pp. 1-11.

Taiwan Search Report—TW111104255—TIPO—May 10, 2025.

European Search Report—EP25195370—Search Authority—The Hague—Dec. 3, 2025.

Moderator (Huawei), et aL, "Email Discussion Summary for [96e][215] NR_pos_RRM_1", 3GPP Draft, 3GPP TSG-RAN WG4 Meeting # 96-e, R4-2012215, 3GPP TSG-RAN WG4 Meeting # 96-e3rd Generation Partnership Project, Mobile Competence Centre, 650, Route Des Lucioles, F-06921, Sophia-Antipolis Cedex, France, vol. RAN WG4, No. Electronic Meeting, Aug. 17-Aug. 28, 2020, Aug. 30, 2020, 105 Pages, XP051923658, Section 2.3.1.

* cited by examiner

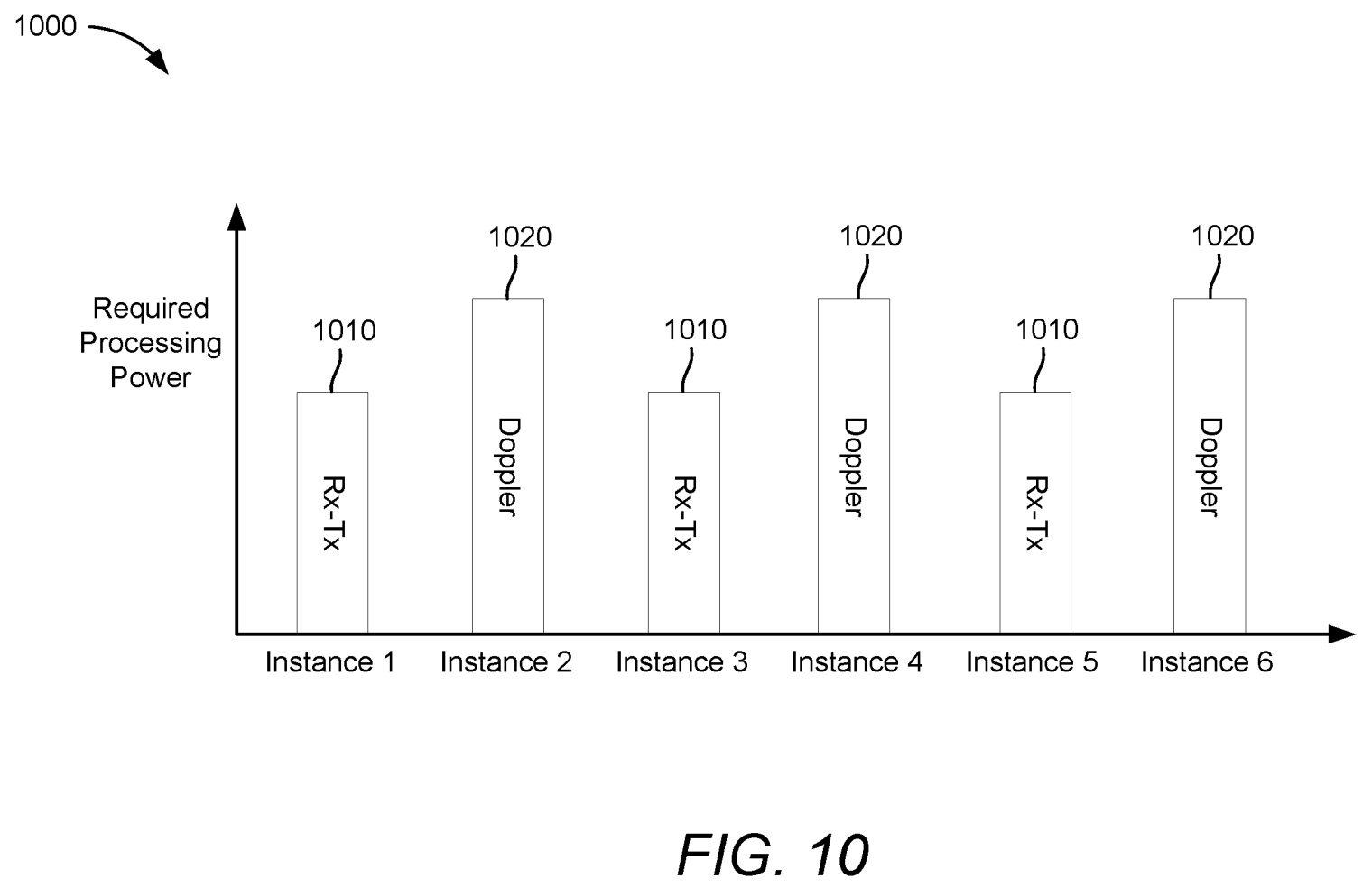

1000

Required Processing Power

1010 Rx-Tx
Instance 1

1020 Doppler
Instance 2

1010 Rx-Tx
Instance 3

1020 Doppler
Instance 4

1010 Rx-Tx
Instance 5

1020 Doppler
Instance 6

FIG. 10

FACTORS AFFECTING MEASUREMENT PERIOD FORMULATION FOR POSITIONING

CROSS-REFERENCE TO RELATED APPLICATIONS

The present Application for Patent is a continuation of International Patent Application No. PCT/US2022/070480, entitled "FACTORS AFFECTING MEASUREMENT PERIOD FORMULATION FOR POSITIONING," filed Feb. 2, 2022, which claims priority to Greek Patent Application No. 20210100190, entitled "FACTORS AFFECTING MEASUREMENT PERIOD FORMULATION FOR POSITIONING," filed Mar. 26, 2021, each of which is assigned to the assignee hereof and expressly incorporated herein by reference in its entirety.

BACKGROUND OF THE DISCLOSURE

1. Field of the Disclosure

Aspects of the disclosure relate generally to wireless positioning.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless positioning performed by a user equipment (UE) includes receiving a request location information message from the network entity, the request location information message including one or more start measurement time parameters indicating a start time of a measurement period during which the UE is expected to perform one or more positioning measurements; and performing the one or more positioning measurements of one or more positioning reference signal (PRS) resources on a first positioning frequency layer during the measurement period, wherein a start of the measurement period is based on the one or more PRS resources, a reception time, and the one or more start measurement time parameters.

In an aspect, method of wireless positioning performed by a user equipment (UE) includes receiving a location assistance data message from a network entity; receiving a request location information message from the network entity, the request location information message including a measurement period during which the UE is expected to perform one or more positioning measurements, wherein a length of the measurement period is based on whether the one or more positioning measurements include a velocity-based measurement or only time-based measurements, signal strength-based measurements, or both; and performing the one or more positioning measurements of one or more positioning reference signal (PRS) resources on a first positioning frequency layer during the measurement period.

In an aspect, a user equipment (UE) includes a memory; a communication interface; and at least one processor communicatively coupled to the memory and the communication interface, the at least one processor configured to: receive, via the communication interface, a request location information message from the network entity, the request location information message including one or more start measurement time parameters indicating a start time of a measurement period during which the UE is expected to perform one or more positioning measurements; and perform the one or more positioning measurements of one or more positioning reference signal (PRS) resources on a first positioning frequency layer during the measurement period, wherein a start of the measurement period is based on the one or more PRS resources, a reception time, and the one or more start measurement time parameters.

In an aspect, a user equipment (UE) includes a memory; a communication interface; and at least one processor communicatively coupled to the memory and the communication interface, the at least one processor configured to: receive, via the communication interface, a location assistance data message from a network entity; receive, via the communication interface, a request location information message from the network entity, the request location information message including a measurement period during which the UE is expected to perform one or more positioning measurements, wherein a length of the measurement period is based on whether the one or more positioning measurements include a velocity-based measurement or only time-based measurements, signal strength-based measurements, or both; and perform the one or more positioning measurements of one or more positioning reference signal (PRS) resources on a first positioning frequency layer during the measurement period.

In an aspect, a user equipment (UE) includes means for receiving a request location information message from the network entity, the request location information message including one or more start measurement time parameters indicating a start time of a measurement period during which the UE is expected to perform one or more positioning measurements; and means for performing the one or more positioning measurements of one or more positioning reference signal (PRS) resources on a first positioning frequency layer during the measurement period, wherein a start of the measurement period is based on the one or more PRS resources, a reception time, and the one or more start measurement time parameters.

In an aspect, a user equipment (UE) includes means for receiving a location assistance data message from a network entity; means for receiving a request location information message from the network entity, the request location information message including a measurement period during which the UE is expected to perform one or more positioning measurements, wherein a length of the measurement period is based on whether the one or more positioning measurements include a velocity-based measurement or only time-based measurements, signal strength-based measurements, or both; and means for performing the one or more positioning measurements of one or more positioning reference signal (PRS) resources on a first positioning frequency layer during the measurement period.

In an aspect, a non-transitory computer-readable medium stores computer-executable instructions that, when executed by a user equipment (UE), cause the UE to: receive a request location information message from the network entity, the request location information message including one or more start measurement time parameters indicating a start time of a measurement period during which the UE is expected to perform one or more positioning measurements; and perform the one or more positioning measurements of one or more positioning reference signal (PRS) resources on a first positioning frequency layer during the measurement period, wherein a start of the measurement period is based on the one or more PRS resources, a reception time, and the one or more start measurement time parameters.

In an aspect, a non-transitory computer-readable medium stores computer-executable instructions that, when executed by a user equipment (UE), cause the UE to: receive a location assistance data message from a network entity; receive a request location information message from the network entity, the request location information message including a measurement period during which the UE is expected to perform one or more positioning measurements, wherein a length of the measurement period is based on whether the one or more positioning measurements include a velocity-based measurement or only time-based measurements, signal strength-based measurements, or both; and perform the one or more positioning measurements of one or more positioning reference signal (PRS) resources on a first positioning frequency layer during the measurement period.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIG. 10 is a diagram illustrating the difference in processing power needed for different types of positioning measurements, according to aspects of the disclosure.

DETAILED DESCRIPTION

Figure 1:
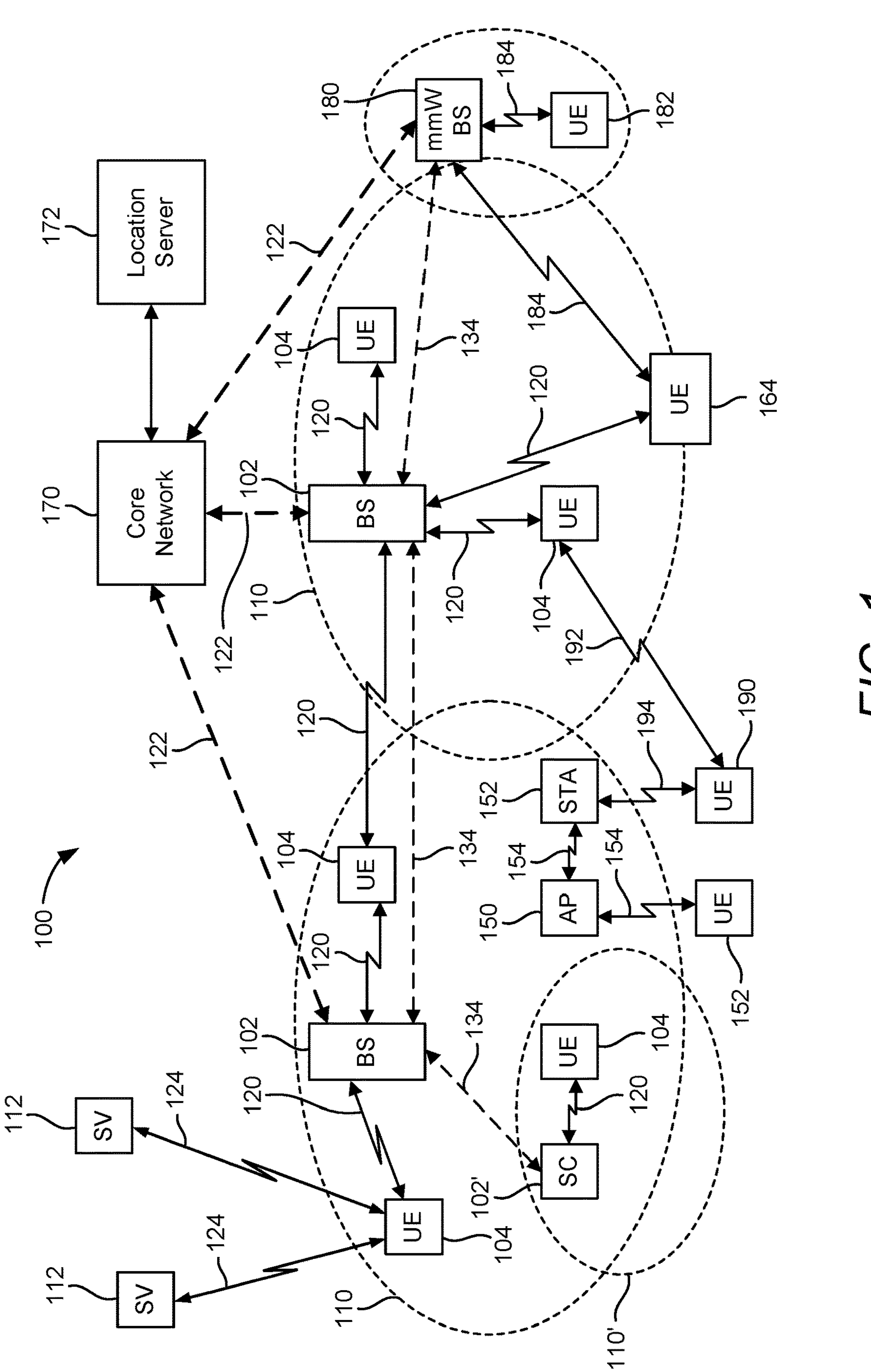
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words “exemplary” and/or “example” are used herein to mean “serving as an example, instance, or illustration.” Any aspect described herein as “exemplary” and/or “example” is not necessarily to be construed as preferred or advantageous over other aspects. Likewise, the term “aspects of the disclosure” does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell (SC) base station 102' may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNB s (HeNB s), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a target reference RF signal on a target beam can be derived from information about a source reference RF signal on a source beam. If the source reference RF signal is QCL Type A, the receiver can use the source reference RF signal to estimate the Doppler shift, Doppler spread, average delay, and delay spread of a target reference RF signal transmitted on the same channel. If the source reference RF signal is QCL Type B, the receiver can use the source reference RF signal to estimate the Doppler shift and Doppler spread of a target reference RF signal transmitted on the same channel. If the source reference RF signal is QCL Type C, the receiver can use the source reference RF signal to estimate the Doppler shift and average delay of a target reference RF signal transmitted on the same channel. If the source reference RF signal is QCL Type D, the receiver can use the source reference RF signal to estimate the spatial receive parameter of a target reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a base station. The UE can then form a transmit beam for sending one or more uplink reference signals (e.g., uplink positioning reference signals (UL-PRS), sounding reference signal (SRS), demodulation reference signals (DMRS), PTRS, etc.) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In the example of FIG. 1, one or more Earth orbiting satellite positioning system (SPS) space vehicles (SVs) 112 (e.g., satellites) may be used as an independent source of location information for any of the illustrated UEs (shown in FIG. 1 as a single UE 104 for simplicity). A UE 104 may include one or more dedicated SPS receivers specifically designed to receive SPS signals 124 for deriving geo location information from the SVs 112. An SPS typically includes a system of transmitters (e.g., SVs 112) positioned to enable receivers (e.g., UEs 104) to determine their location on or above the Earth based, at least in part, on signals (e.g., SPS signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104.

The use of SPS signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, an SPS may include any combination of one or more global and/or regional navigation satellite systems and/or augmentation systems, and SPS signals 124 may include SPS, SPS-like, and/or other signals associated with such one or more SPS.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
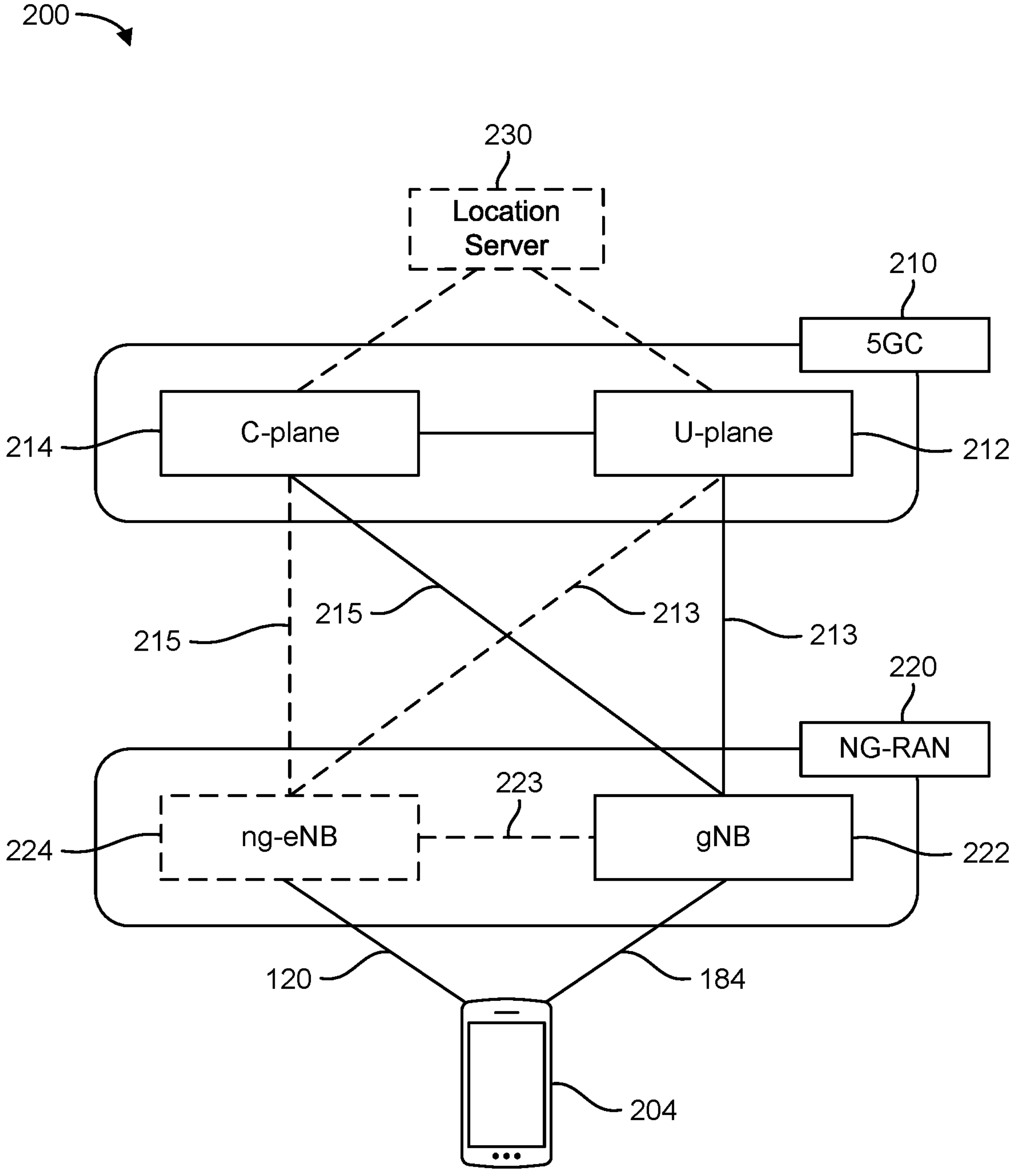
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the control plane functions 214 and user plane functions 212. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). Another optional aspect may include location server 230, which may be in communication with the 5GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network.

Figure 2B:
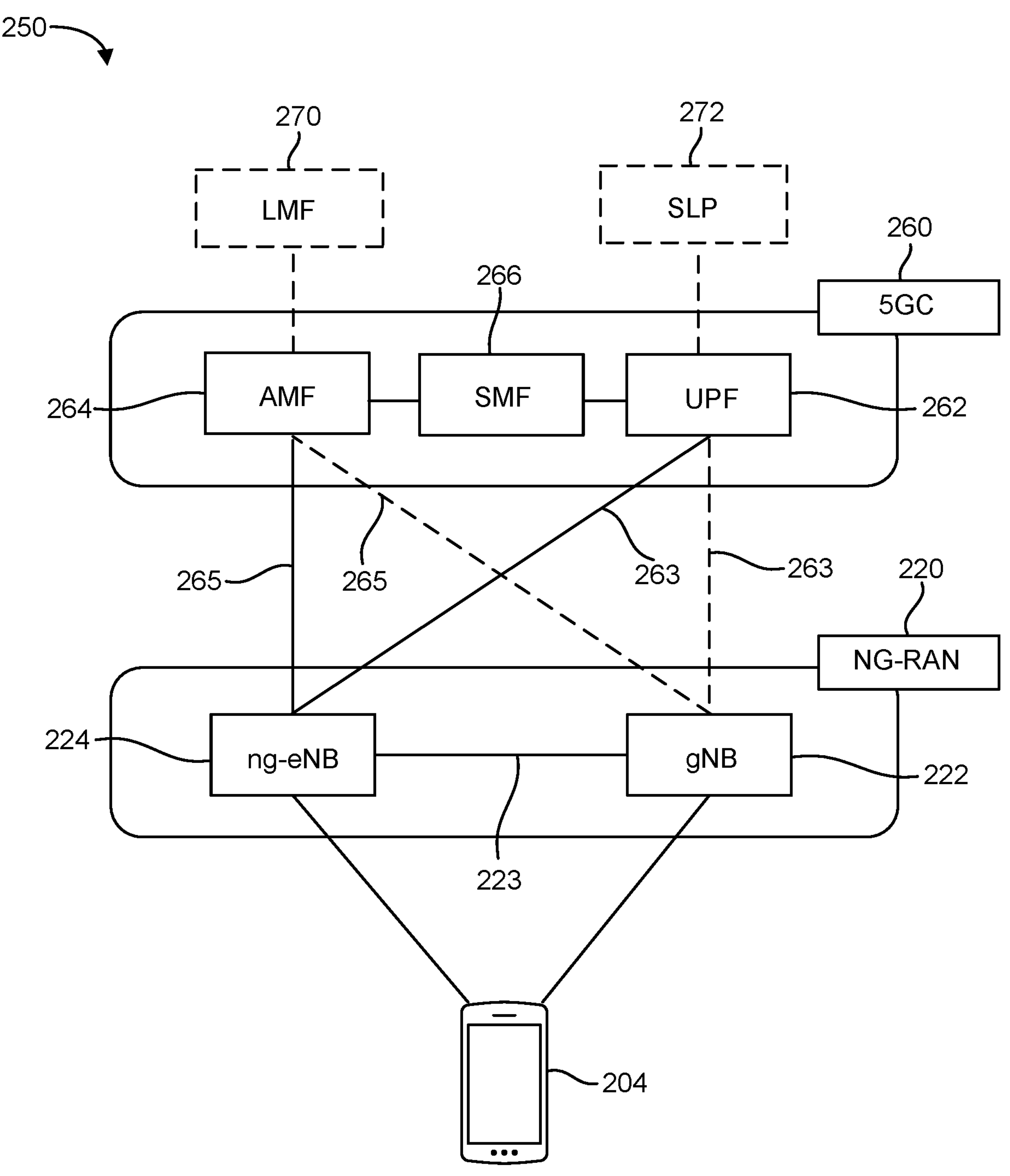

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the NG-RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The base stations of the NG-RAN 220 communicate with the AMF 264 over the N2 interface and with the UPF 262 over the N3 interface.

The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and an LMF 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

Figure 3A:
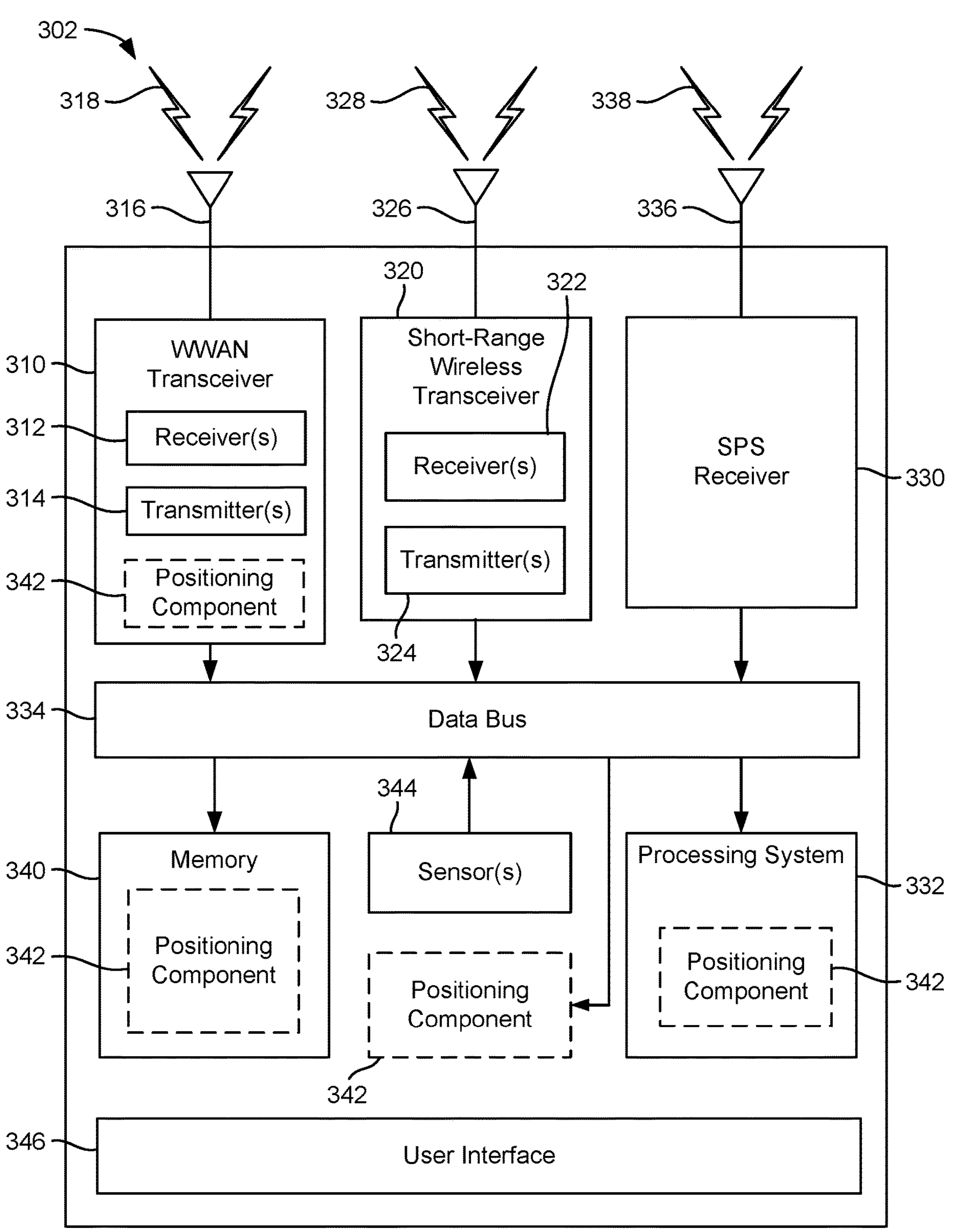
FIGS. 3A to 3C are simplified block diagrams of several sample aspects of components that may be employed in a user equipment (UE), a base station, and a network entity, respectively, and configured to support communications as taught herein.
Figure 3B:
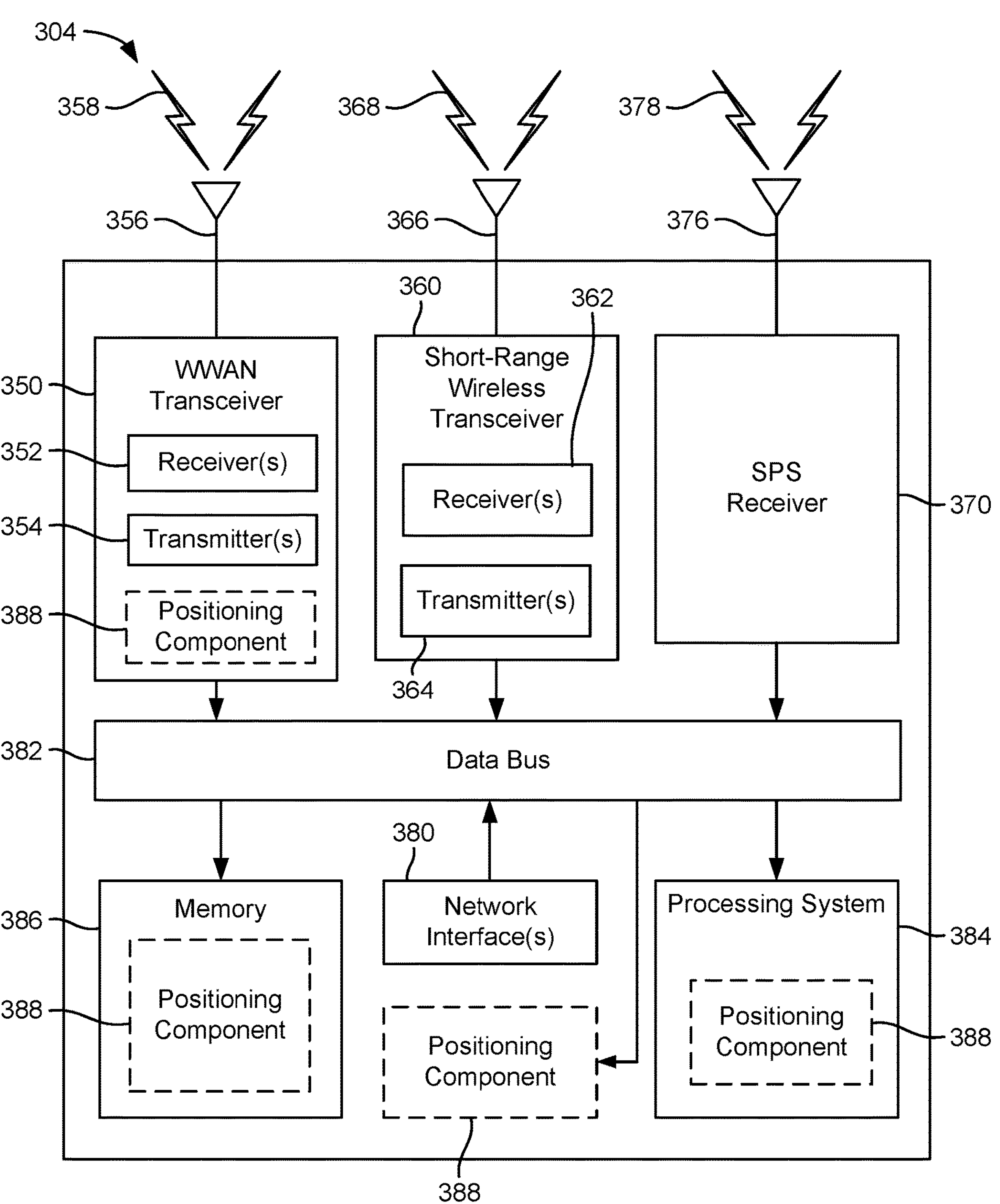
Figure 3C:
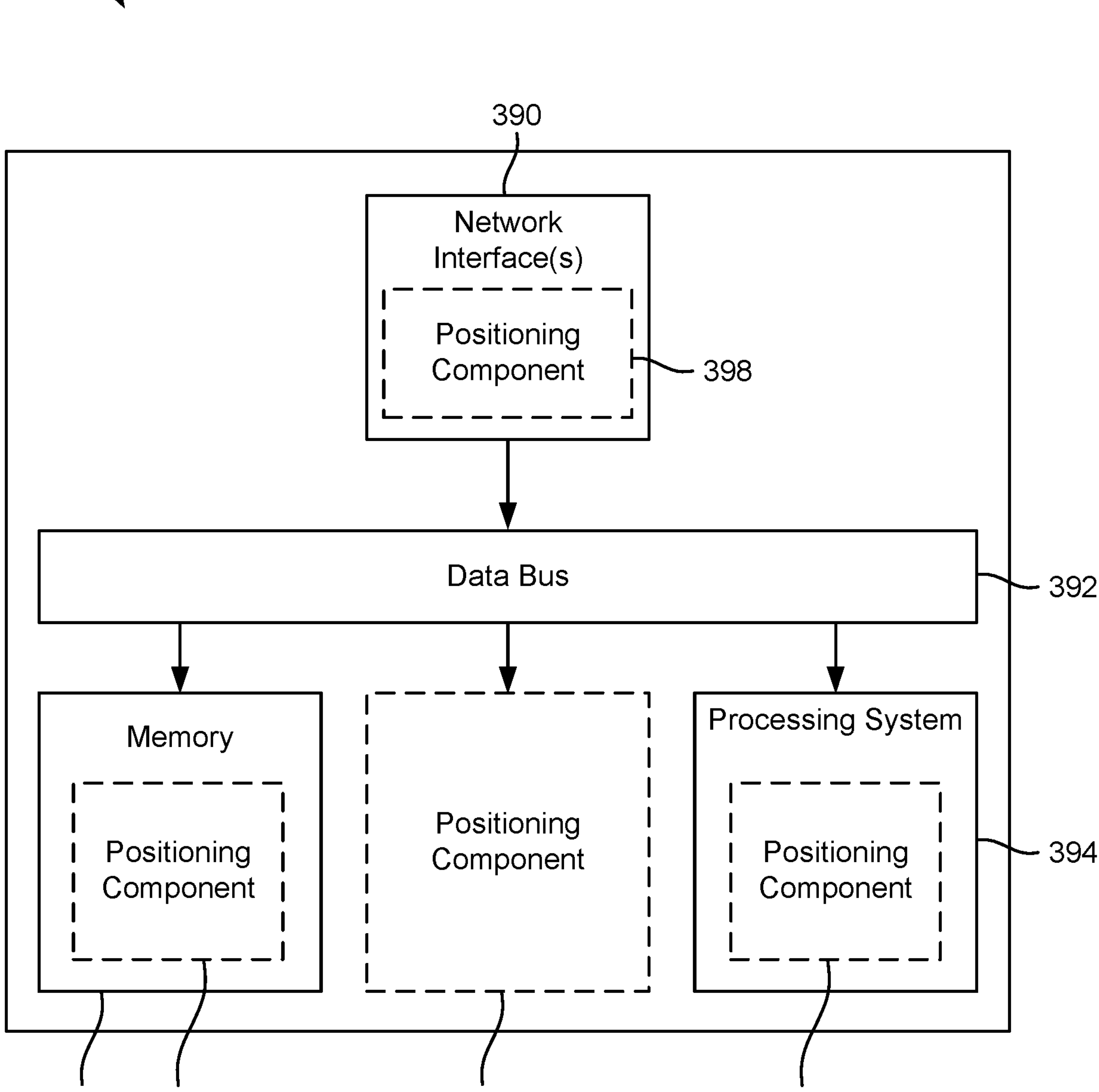

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include wireless wide area network (WWAN) transceiver 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PCS, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 326, 356, 366), such as an antenna array, that permits the respective apparatus to perform transmit "beamforming," as described herein. Similarly, a receiver may include or be coupled to a plurality of antennas (e.g., antennas 316, 326, 356, 366), such as an antenna array, that permits the respective apparatus to perform receive beamforming, as described herein. In an aspect, the transmitter and receiver may share the same plurality of antennas (e.g., antennas 316, 326, 356, 366), such that the respective apparatus can only receive or transmit at a given time, not both at the same time. A wireless communication device (e.g., one or both of the transceivers 310 and 320 and/or 350 and 360) of the UE 302 and/or the base station 304 may also comprise a network listen module (NLM) or the like for performing various measurements.

The UE 302 and the base station 304 also include, at least in some cases, satellite positioning systems (SPS) receivers 330 and 370. The SPS receivers 330 and 370 may be connected to one or more antennas 336 and 376, respectively, and may provide means for receiving and/or measuring SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine positions of the UE 302 and the base station 304 using measurements obtained by any suitable SPS algorithm.

The base station 304 and the network entity 306 each include at least one network interfaces 380 and 390, respectively, providing means for communicating (e.g., means for transmitting, means for receiving, etc.) with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving messages, parameters, and/or other types of information.

The UE 302, the base station 304, and the network entity 306 also include other components that may be used in conjunction with the operations as disclosed herein. The UE 302 includes processor circuitry implementing a processing system 332 for providing functionality relating to, for example, wireless positioning, and for providing other processing functionality. The base station 304 includes a processing system 384 for providing functionality relating to, for example, wireless positioning as disclosed herein, and for providing other processing functionality. The network entity 306 includes a processing system 394 for providing functionality relating to, for example, wireless positioning as disclosed herein, and for providing other processing functionality. The processing systems 332, 384, and 394 may therefore provide means for processing, such as means for determining, means for calculating, means for receiving, means for transmitting, means for indicating, etc. In an aspect, the processing systems 332, 384, and 394 may include, for example, one or more processors, such as one or more general purpose processors, multi-core processors, ASICs, digital signal processors (DSPs), field programmable gate arrays (FPGA), other programmable logic devices or processing circuitry, or various combinations thereof.

The UE 302, the base station 304, and the network entity 306 include memory circuitry implementing memory components 340, 386, and 396 (e.g., each including a memory device), respectively, for maintaining information (e.g., information indicative of reserved resources, thresholds, parameters, and so on). The memory components 340, 386, and 396 may therefore provide means for storing, means for retrieving, means for maintaining, etc. In some cases, the UE 302, the base station 304, and the network entity 306 may include positioning components 342, 388, and 398, respectively. The positioning components 342, 388, and 398 may be hardware circuits that are part of or coupled to the processing systems 332, 384, and 394, respectively, that, when executed, cause the UE 302, the base station 304, and the network entity 306 to perform the functionality described herein. In other aspects, the positioning components 342, 388, and 398 may be external to the processing systems 332, 384, and 394 (e.g., part of a modem processing system, integrated with another processing system, etc.). Alternatively, the positioning components 342, 388, and 398 may be memory modules stored in the memory components 340, 386, and 396, respectively, that, when executed by the processing systems 332, 384, and 394 (or a modem processing system, another processing system, etc.), cause the UE 302, the base station 304, and the network entity 306 to perform the functionality described herein. FIG. 3A illustrates possible locations of the positioning component 342, which may be part of the WWAN transceiver 310, the memory component 340, the processing system 332, or any combination thereof, or may be a standalone component. FIG. 3B illustrates possible locations of the positioning component 388, which may be part of the WWAN transceiver 350, the memory component 386, the processing system 384, or any combination thereof, or may be a standalone component. FIG. 3C illustrates possible locations of the positioning component 398, which may be part of the network interface(s) 390, the memory component 396, the processing system 394, or any combination thereof, or may be a standalone component.

The UE 302 may include one or more sensors 344 coupled to the processing system 332 to provide means for sensing or detecting movement and/or orientation information that is independent of motion data derived from signals received by the WWAN transceiver 310, the short-range wireless transceiver 320, and/or the SPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 (L3) and Layer-2 (L2) functionality.

In the uplink, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the downlink transmission by the base station 304, the processing system 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARM), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the uplink, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the UE 302, the base station 304, and/or the network entity 306 are shown in FIGS. 3A to 3C as including various components that may be configured according to the various examples described herein. It will be appreciated, however, that the illustrated blocks may have different functionality in different designs.

The various components of the UE 302, the base station 304, and the network entity 306 may communicate with each other over data buses 334, 382, and 392, respectively. The components of FIGS. 3A to 3C may be implemented in various ways. In some implementations, the components of FIGS. 3A to 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processing systems 332, 384, 394, the transceivers 310, 320, 350, and 360, the memory components 340, 386, and 396, the positioning components 342, 388, and 398, etc.

Figure 4A:
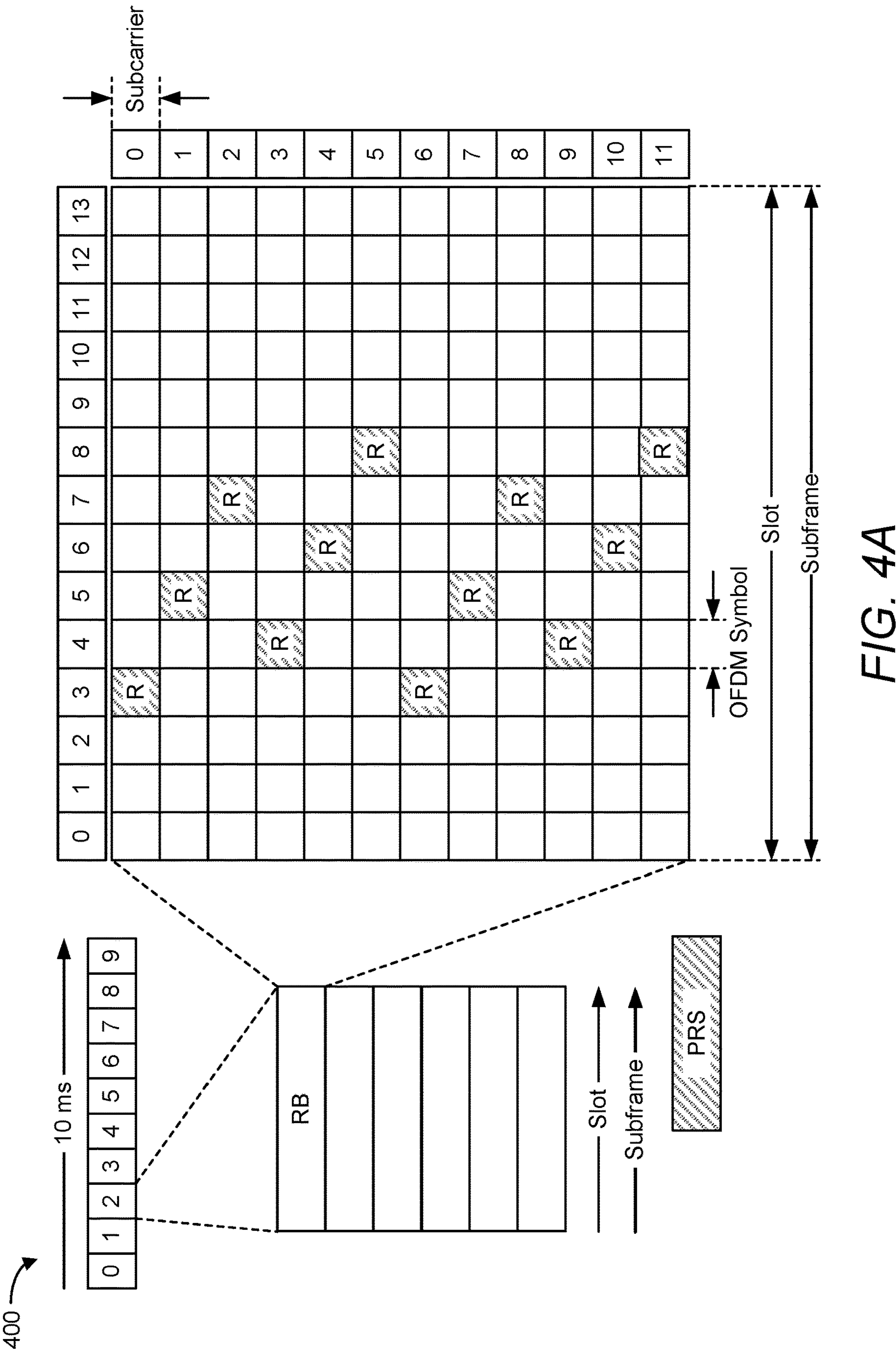
FIGS. 4A and 4B are diagrams illustrating example frame structures and channels within the frame structures, according to aspects of the disclosure.
Figure 4B:
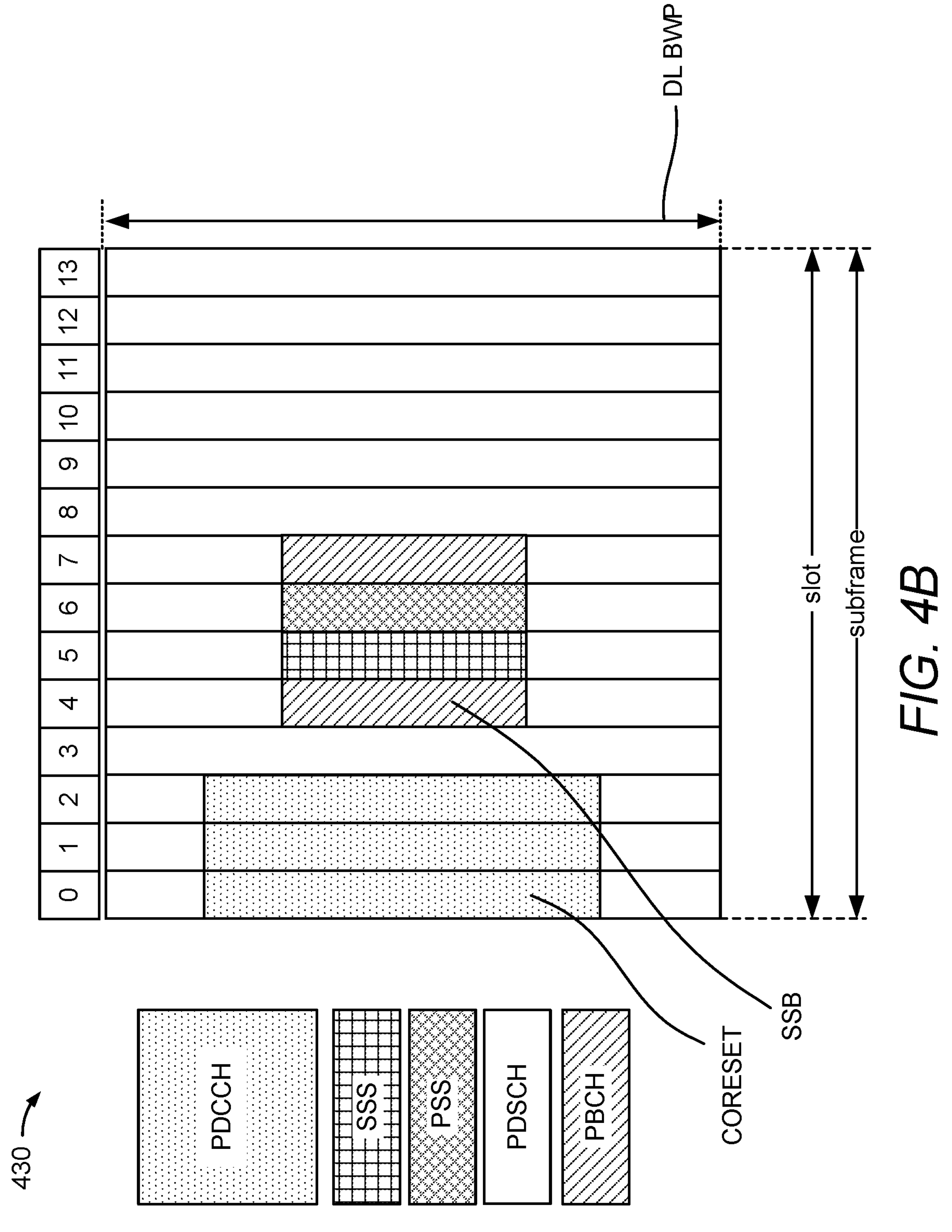

Various frame structures may be used to support downlink and uplink transmissions between network nodes (e.g., base stations and UEs). FIG. 4A is a diagram 400 illustrating an example of a downlink frame structure, according to aspects of the disclosure. FIG. 4B is a diagram 430 illustrating an example of channels within the downlink frame structure, according to aspects of the disclosure. Other wireless communications technologies may have different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kilohertz (kHz) and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing (SCS), symbol length, etc.). In contrast, NR may support multiple numerologies (μ), for example, subcarrier spacings of 15 kHz (μ=0), 30 kHz (μ=1), 60 kHz (μ=2), 120 kHz (μ=3), and 240 kHz (μ=4) or greater may be available. In each subcarrier spacing, there are 14 symbols per slot. For 15 kHz SCS (μ=0), there is one slot per subframe, 10 slots per frame, the slot duration is 1 millisecond (ms), the symbol duration is 66.7 microseconds (μs), and the maximum nominal system bandwidth (in MHz) with a 4K FFT size is 50. For 30 kHz SCS (μ=1), there are two slots per subframe, 20 slots per frame, the slot duration is 0.5 ms, the symbol duration is 33.3 μs, and the maximum nominal system bandwidth (in MHz) with a 4K FFT size is 100. For 60 kHz SCS (μ=2), there are four slots per subframe, 40 slots per frame, the slot duration is 0.25 ms, the symbol duration is 16.7 μs, and the maximum nominal system bandwidth (in MHz) with a 4K FFT size is 200. For 120 kHz SCS (μ=3), there are eight slots per subframe, 80 slots per frame, the slot duration is 0.125 ms, the symbol duration is 8.33 μs, and the maximum nominal system bandwidth (in MHz) with a 4K FFT size is 400. For 240 kHz SCS (μ=4), there are 16 slots per subframe, 160 slots per frame, the slot duration is 0.0625 ms, the symbol duration is 4.17 μs, and the maximum nominal system bandwidth (in MHz) with a 4K FFT size is 800.

In the example of FIGS. 4A and 4B, a numerology of 15 kHz is used. Thus, in the time domain, a 10 ms frame is divided into 10 equally sized subframes of 1 ms each, and each subframe includes one time slot. In FIGS. 4A and 4B, time is represented horizontally (on the X axis) with time increasing from left to right, while frequency is represented vertically (on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIGS. 4A and 4B, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs carry downlink reference (pilot) signals (DL-RS). The DL-RS may include PRS, TRS, PTRS, CRS, CSI-RS, DMRS, PSS, SSS, SSB, etc. FIG. 4A illustrates example locations of REs carrying PRS (labeled "R").

A collection of resource elements (REs) that are used for transmission of PRS is referred to as a "PRS resource." The collection of resource elements can span multiple PRBs in the frequency domain and 'N' (such as 1 or more) consecutive symbol(s) within a slot in the time domain. In a given OFDM symbol in the time domain, a PRS resource occupies consecutive PRBs in the frequency domain.

The transmission of a PRS resource within a given PRB has a particular comb size (also referred to as the "comb density"). A comb size 'N' represents the subcarrier spacing (or frequency/tone spacing) within each symbol of a PRS resource configuration. Specifically, for a comb size 'N,' PRS are transmitted in every Nth subcarrier of a symbol of a PRB. For example, for comb-4, for each symbol of the PRS resource configuration, REs corresponding to every fourth subcarrier (such as subcarriers 0, 4, 8) are used to transmit PRS of the PRS resource. Currently, comb sizes of comb-2, comb-4, comb-6, and comb-12 are supported for DL-PRS. FIG. 4A illustrates an example PRS resource configuration for comb-6 (which spans six symbols). That is, the locations of the shaded REs (labeled "R") indicate a comb-6 PRS resource configuration.

Currently, a DL-PRS resource may span 2, 4, 6, or 12 consecutive symbols within a slot with a fully frequency-domain staggered pattern. A DL-PRS resource can be configured in any higher layer configured downlink or flexible (FL) symbol of a slot. There may be a constant energy per resource element (EPRE) for all REs of a given DL-PRS resource. The following are the frequency offsets from symbol to symbol for comb sizes 2, 4, 6, and 12 over 2, 4, 6, and 12 symbols. 2-symbol comb-2: {0, 1 }; 4-symbol comb-2: {0, 1, 0, 1}; 6-symbol comb-2: {0, 1, 0, 1, 0, 1}; 12-symbol comb-2: {0, 1, 0, 1, 0, 1, 0, 1, 0, 1, 0, 1 }; 4-symbol comb-4: {0, 2, 1, 3 }; 12-symbol comb-4: {0, 2, 1, 3, 0, 2, 1, 3, 0, 2, 1, 3 }; 6-symbol comb-6: {0, 3, 1, 4, 2, 5}; 12-symbol comb-6: {0, 3, 1, 4, 2, 5, 0, 3, 1, 4, 2, 5}; and 12-symbol comb-12: {0, 6, 3, 9, 1, 7, 4, 10, 2, 8, 5, 11}.

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a TRP ID). In addition, the PRS resources in a PRS resource set have the same periodicity, a common muting pattern configuration, and the same repetition factor (such as "PRS-ResourceRepetitionFactor") across slots. The periodicity is the time from the first repetition of the first PRS resource of a first PRS instance to the same first repetition of the same first PRS resource of the next PRS instance. The periodicity may have a length selected from ^μ*{4, 5, 8, 10, 16, 20, 32, 40, 64, 80, 160, 320, 640, 1280, 2560, 5120, 10240} slots, with μ=0, 1, 2, 3. The repetition factor may have a length selected from {1, 2, 4, 6, 8, 16, 32} slots.

A PRS resource ID in a PRS resource set is associated with a single beam (or beam ID) transmitted from a single TRP (where a TRP may transmit one or more beams). That is, each PRS resource of a PRS resource set may be transmitted on a different beam, and as such, a "PRS resource," or simply "resource," also can be referred to as a "beam." Note that this does not have any implications on whether the TRPs and the beams on which PRS are transmitted are known to the UE.

A "PRS instance" or "PRS occasion" is one instance of a periodically repeated time window (such as a group of one or more consecutive slots) where PRS are expected to be transmitted. A PRS occasion also may be referred to as a "PRS positioning occasion," a "PRS positioning instance," a "positioning occasion," "a positioning instance," a "positioning repetition," or simply an "occasion," an "instance," or a "repetition."

A "positioning frequency layer" (also referred to simply as a "frequency layer") is a collection of one or more PRS resource sets across one or more TRPs that have the same values for certain parameters. Specifically, the collection of PRS resource sets has the same subcarrier spacing and cyclic prefix (CP) type (meaning all numerologies supported for the physical downlink shared channel (PDSCH) are also supported for PRS), the same Point A, the same value of the downlink PRS bandwidth, the same start PRB (and center frequency), and the same comb-size. The Point A parameter takes the value of the parameter "ARFCN-ValueNR" (where "ARFCN" stands for "absolute radio-frequency channel number") and is an identifier/code that specifies a pair of physical radio channel used for transmission and reception. The downlink PRS bandwidth may have a granularity of four PRBs, with a minimum of 24 PRBs and a maximum of 272 PRBs. Currently, up to four frequency layers have been defined, and up to two PRS resource sets may be configured per TRP per frequency layer.

The concept of a frequency layer is somewhat like the concept of component carriers and bandwidth parts (BWPs), but different in that component carriers and BWPs are used by one base station (or a macro cell base station and a small cell base station) to transmit data channels, while frequency layers are used by several (usually three or more) base stations to transmit PRS. A UE may indicate the number of frequency layers it can support when it sends the network its positioning capabilities, such as during an LTE positioning protocol (LPP) session. For example, a UE may indicate whether it can support one or four positioning frequency layers.

FIG. 4B illustrates an example of various channels within a downlink slot of a radio frame. In NR, the channel bandwidth, or system bandwidth, is divided into multiple BWPs. A BWP is a contiguous set of PRBs selected from a contiguous subset of the common RBs for a given numerology on a given carrier. Generally, a maximum of four BWPs can be specified in the downlink and uplink. That is, a UE can be configured with up to four BWPs on the downlink, and up to four BWPs on the uplink. Only one BWP (uplink or downlink) may be active at a given time, meaning the UE may only receive or transmit over one BWP at a time. On the downlink, the bandwidth of each BWP should be equal to or greater than the bandwidth of the SSB, but it may or may not contain the SSB.

Referring to FIG. 4B, a primary synchronization signal (PSS) is used by a UE to determine subframe/symbol timing and a physical layer identity. A secondary synchronization signal (SSS) is used by a UE to determine a physical layer cell identity group number and radio frame timing. Based on the physical layer identity and the physical layer cell identity group number, the UE can determine a PCI. Based on the PCI, the UE can determine the locations of the aforementioned DL-RS. The physical broadcast channel (PBCH), which carries an MIB, may be logically grouped with the PSS and SSS to form an SSB (also referred to as an SS/PBCH). The MIB provides a number of RBs in the downlink system bandwidth and a system frame number (SFN). The PDSCH carries user data, broadcast system information not transmitted through the PBCH, such as system information blocks (SIBs), and paging messages.

The physical downlink control channel (PDCCH) carries downlink control information (DCI) within one or more control channel elements (CCEs), each CCE including one or more RE group (REG) bundles (which may span multiple symbols in the time domain), each REG bundle including one or more REGs, each REG corresponding to 12 resource elements (one resource block) in the frequency domain and one OFDM symbol in the time domain. The set of physical resources used to carry the PDCCH/DCI is referred to in NR as the control resource set (CORESET). In NR, a PDCCH is confined to a single CORESET and is transmitted with its own DMRS. This enables UE-specific beamforming for the PDCCH.

In the example of FIG. 4B, there is one CORESET per BWP, and the CORESET spans three symbols (although it may be only one or two symbols) in the time domain. Unlike LTE control channels, which occupy the entire system bandwidth, in NR, PDCCH channels are localized to a specific region in the frequency domain (i.e., a CORESET). Thus, the frequency component of the PDCCH shown in FIG. 4B is illustrated as less than a single BWP in the frequency domain. Note that although the illustrated CORESET is contiguous in the frequency domain, it need not be. In addition, the CORESET may span less than three symbols in the time domain.

The DCI within the PDCCH carries information about uplink resource allocation (persistent and non-persistent) and descriptions about downlink data transmitted to the UE, referred to as uplink and downlink grants, respectively. More specifically, the DCI indicates the resources scheduled for the downlink data channel (e.g., PDSCH) and the uplink data channel (e.g., physical uplink shared channel (PUSCH)). Multiple (e.g., up to eight) DCIs can be configured in the PDCCH, and these DCIs can have one of multiple formats. For example, there are different DCI formats for uplink scheduling, for downlink scheduling, for uplink transmit power control (TPC), etc. A PDCCH may be transported by 1, 2, 4, 8, or 16 CCEs in order to accommodate different DCI payload sizes or coding rates.

Figure 5:
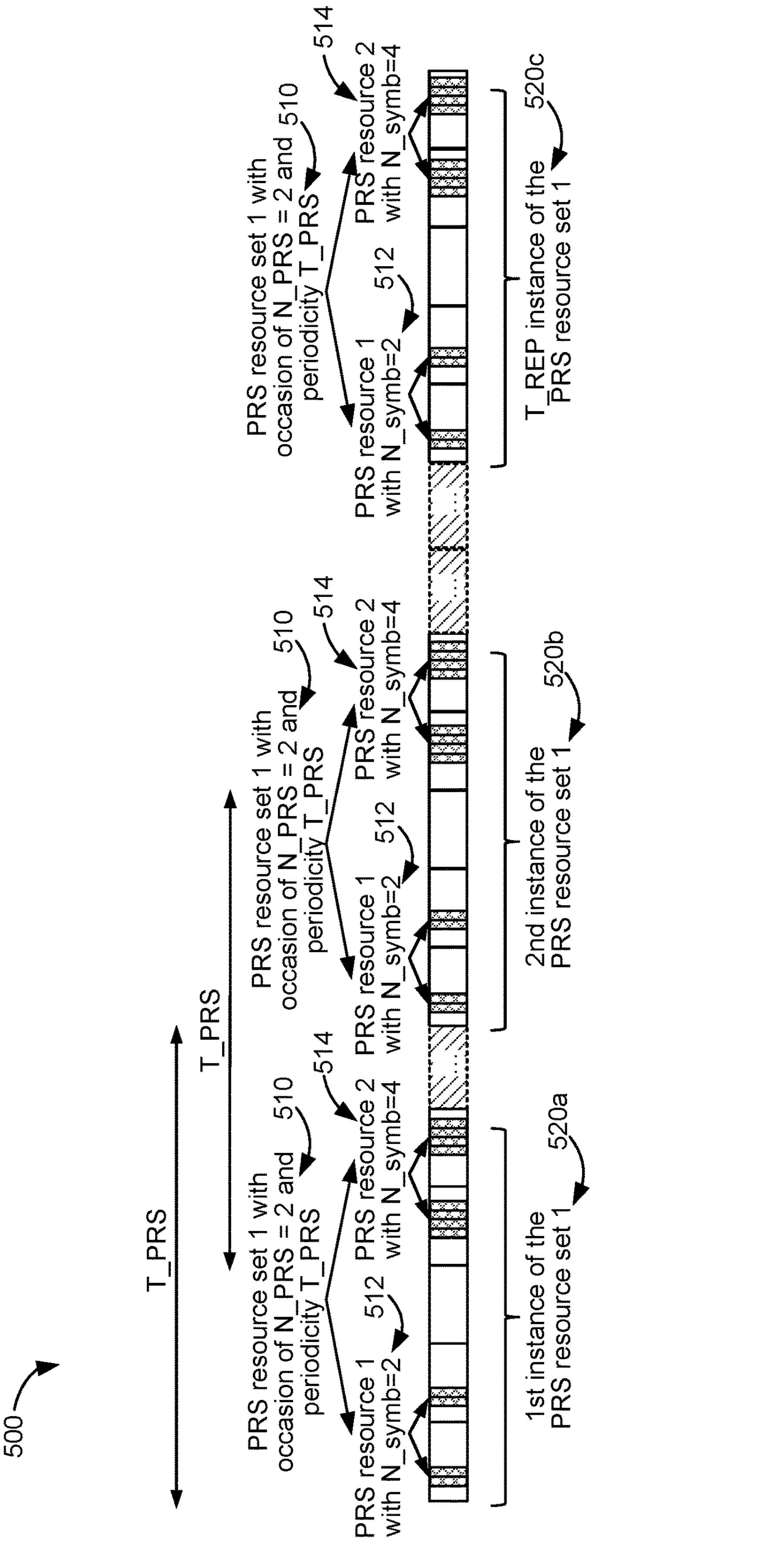
FIG. 5 is a diagram of an example positioning reference signal (PRS) configuration for the PRS transmissions of a given base station, according to aspects of the disclosure.

FIG. 5 is a diagram of an example PRS configuration 500 for the PRS transmissions of a given base station, according to aspects of the disclosure. In FIG. 5, time is represented horizontally, increasing from left to right. Each long rectangle represents a slot and each short (shaded) rectangle represents an OFDM symbol. In the example of FIG. 5, a PRS resource set 510 (labeled "PRS resource set 1") includes two PRS resources, a first PRS resource 512 (labeled "PRS resource 1") and a second PRS resource 514 (labeled "PRS resource 2"). The base station transmits PRS on the PRS resources 512 and 514 of the PRS resource set 510.

The PRS resource set 510 has an occasion length (N_PRS) of two slots and a periodicity (T_PRS) of, for example, 160 slots or 160 milliseconds (ms) (for 15 kHz subcarrier spacing). As such, both the PRS resources 512 and 514 are two consecutive slots in length and repeat every T_PRS slots, starting from the slot in which the first symbol of the respective PRS resource occurs. In the example of FIG. 5, the PRS resource 512 has a symbol length (N_symb) of two symbols, and the PRS resource 514 has a symbol length (N_symb) of four symbols. The PRS resource 512 and the PRS resource 514 may be transmitted on separate beams of the same base station.

Each instance of the PRS resource set 510, illustrated as instances 520*a,* 520*b,* and 520*c,* includes an occasion of length '2' (i.e., N_PRS=2) for each PRS resource 512, 514 of the PRS resource set. The PRS resources 512 and 514 are repeated every T_PRS slots up to the muting sequence periodicity T_REP. As such, a bitmap of length T_REP would be needed to indicate which occasions of instances 520*a,* 520*b,* and 520*c* of PRS resource set 510 are muted (i.e., not transmitted).

In an aspect, there may be additional constraints on the PRS configuration 500. For example, for all PRS resources (e.g., PRS resources 512, 514) of a PRS resource set (e.g., PRS resource set 510), the base station can configure the following parameters to be the same: (a) the occasion length (T_PRS), (b) the number of symbols (N_symb), (c) the comb type, and/or (d) the bandwidth. In addition, for all PRS resources of all PRS resource sets, the subcarrier spacing and the cyclic prefix can be configured to be the same for one base station or for all base stations. Whether it is for one base station or all base stations may depend on the UE' s capability to support the first and/or second option.

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. In an OTDOA or DL-TDOA positioning procedure, a UE measures the differences between the times of arrival (ToAs) of reference signals (e.g., PRS, TRS, CSI-RS, SSB, etc.) received from pairs of base stations, referred to as reference signal time difference (RSTD) or time difference of arrival (TDOA) measurements, and reports them to a positioning entity (the UE for UE-based positioning or a location server or other network entity for UE-assisted positioning). More specifically, the UE receives the identifiers (IDs) of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity can estimate the UE's location.

For DL-AoD positioning, the positioning entity uses a beam report from the UE of received signal strength measurements of multiple downlink transmit beams to determine the angle(s) between the UE and the transmitting base station(s). The positioning entity can then estimate the location of the UE based on the determined angle(s) and the known location(s) of the transmitting base station(s).

Uplink-based positioning methods include uplink time difference of arrival (UL-TDOA) and uplink angle-of-arrival (UL-AoA). UL-TDOA is similar to DL-TDOA, but is based on uplink reference signals (e.g., SRS) transmitted by the UE. For UL-AoA positioning, one or more base stations measure the received signal strength of one or more uplink reference signals (e.g., SRS) received from a UE on one or more uplink receive beams. The positioning entity uses the signal strength measurements and the angle(s) of the receive beam(s) to determine the angle(s) between the UE and the base station(s). Based on the determined angle(s) and the known location(s) of the base station(s), the positioning entity can then estimate the location of the UE.

Downlink-and-uplink-based positioning methods include enhanced cell-ID (E-CID) positioning and multi-round-trip-time (RTT) positioning (also referred to as "multi-cell RTT"). In an RTT procedure, an initiator (a base station or a UE) transmits an RTT measurement signal (e.g., a PRS or SRS) to a responder (a UE or base station), which transmits an RTT response signal (e.g., an SRS or PRS) back to the initiator. The RTT response signal includes the difference between the ToA of the RTT measurement signal and the transmission time of the RTT response signal, referred to as the reception-to-transmission (Rx-Tx) time difference. The initiator calculates the difference between the transmission time of the RTT measurement signal and the ToA of the RTT response signal, referred to as the transmission-to-reception (Tx-Rx) time difference. The propagation time (also referred to as the "time of flight") between the initiator and the responder can be calculated from the Tx-Rx and Rx-Tx time differences. Based on the propagation time and the known speed of light, the distance between the initiator and the responder can be determined. For multi-RTT positioning, a UE performs an RTT procedure with multiple base stations to enable its location to be triangulated based on the known locations of the base stations. RTT and multi-RTT methods can be combined with other positioning techniques, such as UL-AoA and DL-AoD, to improve location accuracy.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base station(s).

To assist positioning operations, a location server (e.g., location server 230, LMF 270, SLP 272) may provide assistance data to the UE. For example, the assistance data may include identifiers of the base stations (or the cells/TRPs of the base stations) from which to measure reference signals, the reference signal configuration parameters (e.g., the number of consecutive positioning subframes, periodicity of positioning subframes, muting sequence, frequency hopping sequence, reference signal identifier, reference signal bandwidth, etc.), and/or other parameters applicable to the particular positioning method. Alternatively, the assistance data may originate directly from the base stations themselves (e.g., in periodically broadcasted overhead messages, etc.). in some cases, the UE may be able to detect neighbor network nodes itself without the use of assistance data.

In the case of an OTDOA or DL-TDOA positioning procedure, the assistance data may further include an expected RSTD value and an associated uncertainty, or search window, around the expected RSTD. In some cases, the value range of the expected RSTD may be +/−500 microseconds (μs). In some cases, when any of the resources used for the positioning measurement are in FR1, the value range for the uncertainty of the expected RSTD may be +/−32 μs. In other cases, when all of the resources used for the positioning measurement(s) are in FR2, the value range for the uncertainty of the expected RSTD may be +/−8 μs.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

Figure 6:
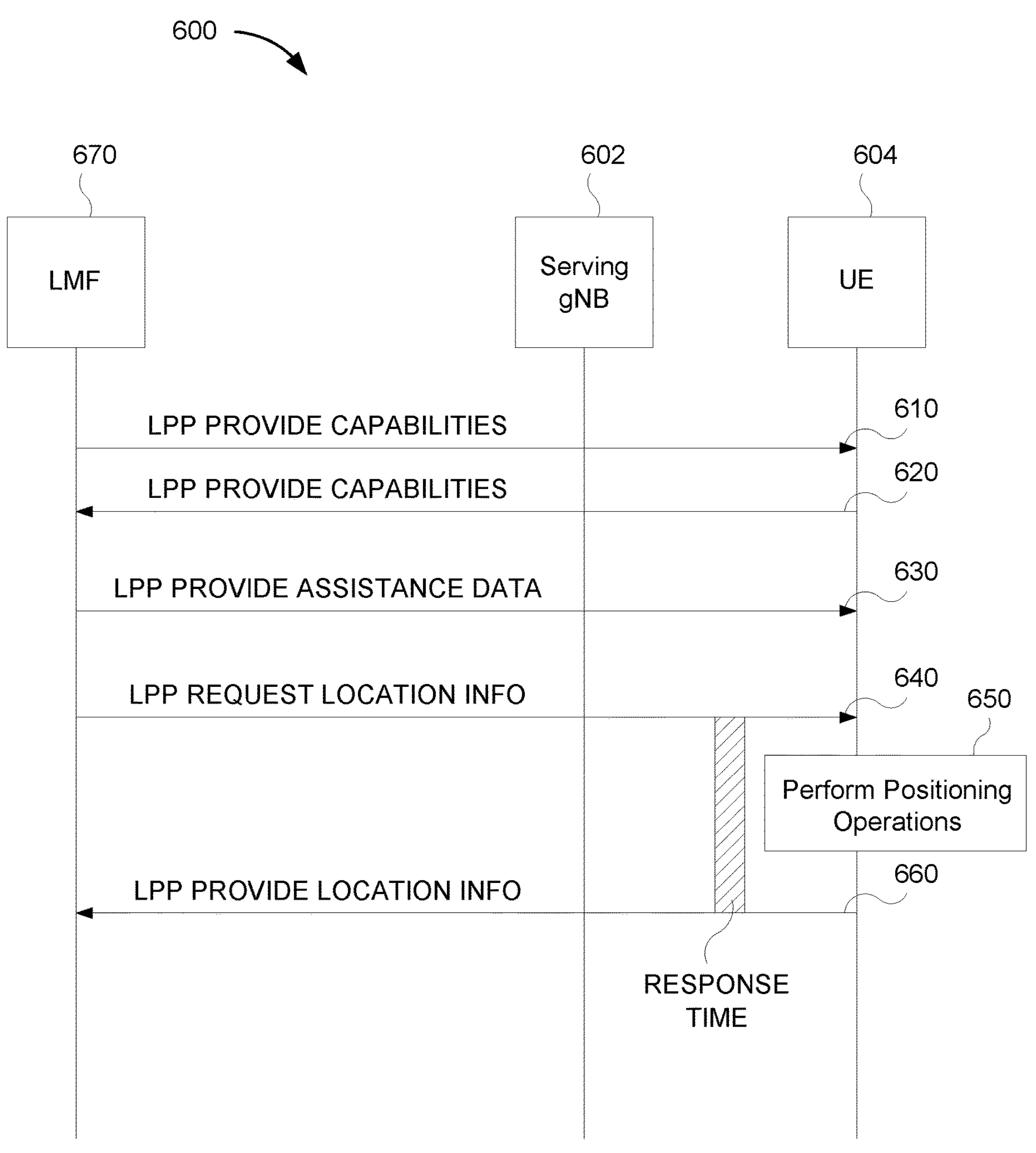
FIG. 6 illustrates an example Long-Term Evolution (LTE) positioning protocol (LPP) call flow between a UE and a location server for performing positioning operations.

FIG. 6 illustrates an example LTE positioning protocol (LPP) procedure 600 between a UE 604 and a location server (illustrated as a location management function (LMF) 670) for performing positioning operations. As illustrated in FIG. 6, positioning of the UE 604 is supported via an exchange of LPP messages between the UE 604 and the LMF 670.

The LPP messages may be exchanged between UE 604 and the LMF 670 via the UE's 604 serving base station (illustrated as a serving gNB 602) and a core network (not shown). The LPP procedure 600 may be used to position the UE 604 in order to support various location-related services, such as navigation for UE 604 (or for the user of UE 604), or for routing, or for provision of an accurate location to a public safety answering point (PSAP) in association with an emergency call from UE 604 to a PSAP, or for some other reason. The LPP procedure 600 may also be referred to as a positioning session, and there may be multiple positioning sessions for different types of positioning methods (e.g., downlink time difference of arrival (DL-TDOA), round-trip-time (RTT), enhanced cell identity (E-CID), etc.).

Initially, the UE 604 may receive a request for its positioning capabilities from the LMF 670 at stage 610 (e.g., an LPP Request Capabilities message). At stage 620, the UE 604 provides its positioning capabilities to the LMF 670 relative to the LPP protocol by sending an LPP Provide Capabilities message to LMF 670 indicating the position methods and features of these position methods that are supported by the UE 604 using LPP. The capabilities indicated in the LPP Provide Capabilities message may, in some aspects, indicate the type of positioning the UE 604 supports (e.g., DL-TDOA, RTT, E-CID, etc.) and may indicate the capabilities of the UE 604 to support those types of positioning.

Upon reception of the LPP Provide Capabilities message, at stage 620, the LMF 670 determines to use a particular type of positioning method (e.g., DL-TDOA, RTT, E-CID, etc.) based on the indicated type(s) of positioning the UE 604 supports and determines a set of one or more transmission-reception points (TRPs) from which the UE 604 is to measure downlink positioning reference signals or towards which the UE 604 is to transmit uplink positioning reference signals. At stage 630, the LMF 670 sends an LPP Provide Assistance Data message to the UE 604 identifying the set of TRPs.

In some implementations, the LPP Provide Assistance Data message at stage 630 may be sent by the LMF 670 to the UE 604 in response to an LPP Request Assistance Data message sent by the UE 604 to the LMF 670 (not shown in FIG. 6). An LPP Request Assistance Data message may include an identifier of the UE's 604 serving TRP and a request for the positioning reference signal (PRS) configuration of neighboring TRPs.

At stage 640, the LMF 670 sends a request for location information to the UE 604. The request may be an LPP Request Location Information message. This message usually includes information elements defining the location information type, desired accuracy of the location estimate, and response time (i.e., desired latency). Note that a low latency requirement allows for a longer response time while a high latency requirement requires a shorter response time. However, a long response time is referred to as high latency and a short response time is referred to as low latency.

Note that in some implementations, the LPP Provide Assistance Data message sent at stage 630 may be sent after the LPP Request Location Information message at 640 if, for example, the UE 604 sends a request for assistance data to LMF 670 (e.g., in an LPP Request Assistance Data message, not shown in FIG. 6) after receiving the request for location information at stage 640.

At stage 650, the UE 604 utilizes the assistance information received at stage 630 and any additional data (e.g., a desired location accuracy or a maximum response time) received at stage 640 to perform positioning operations (e.g., measurements of DL-PRS, transmission of UL-PRS, etc.) for the selected positioning method.

At stage 660, the UE 604 may send an LPP Provide Location Information message to the LMF 670 conveying the results of any measurements that were obtained at stage 650 (e.g., time of arrival (ToA), reference signal time difference (RSTD), reception-to-transmission (Rx-Tx), etc.) and before or when any maximum response time has expired (e.g., a maximum response time provided by the LMF 670 at stage 640). The LPP Provide Location Information message at stage 660 may also include the time (or times) at which the positioning measurements were obtained and the identity of the TRP(s) from which the positioning measurements were obtained. Note that the time between the request for location information at 640 and the response at 660 is the "response time" and indicates the latency of the positioning session.

The LMF 670 computes an estimated location of the UE 604 using the appropriate positioning techniques (e.g., DL-TDOA, RTT, E-CID, etc.) based, at least in part, on measurements received in the LPP Provide Location Information message at stage 660.

With further reference to DL-PRS, DL-PRS have been defined for NR positioning to enable UEs to detect and measure more neighboring TRPs. Several configurations are supported to enable a variety of deployments (e.g., indoor, outdoor, sub-6 GHz, mmW). In addition, beam sweeping is supported for PRS to support PRS beam operation. The following table illustrates various types of reference signals that can be used for various positioning methods supported in NR.

TABLE 1

| DL/UL Reference Signals | UE Measurements | To support the following positioning techniques |
|---|---|---|
| DL-PRS | DL-RSTD | DL-TDOA |
| DL-PRS | DL-PRS RSRP | DL-TDOA, DL-AoD, Multi-RTT |
| DL-PRS/ SRS-for-positioning | UE Rx-Tx | Multi-RTT |
| SSB/CSI-RS for RRM | Synchronization Signal (SS)-RSRP (RSRP for RRM), SS-RSRQ (for RRM), CSI-RSRP (for RRM), CSI-RSRQ (for RRM) | E-CID |

A UE, whether engaged in UE-based or UE-assisted positioning, reports its capability to process PRS to the network (e.g., LMF 670) in the capability information exchange (e.g., in the LPP Provide Capabilities message at stage 620). Based on the UE's capabilities, the UE receives the assistance data needed to perform positioning measurements of PRS resources (e.g., in the LPP Provide Assistance Data message at stage 630). However, the number of PRS resources provided in the assistance data may be significantly higher than the number of PRS resources the UE is actually capable of processing. For example, the UE may only be able to process up to five PRS resources, but the assistance data may include configurations for 20 PRS resources. In such a case, the UE is expected to select the first five PRS resources to process.

Currently, the location server (e.g., LMF 670) can define and request different measurement quantities for different positioning methods in the request location information message (e.g., in the LPP Request Location Information message at stage 640). These measurement quantities can include RSRP, RSRQ, RSTD, ToA, and/or Rx-Tx time difference measurements. For example, the "NR-ECID-RequestLocationInformation" LPP information element (IE), which is used to request NR E-CID location measurements from a target UE, includes a "requestedMeasurements" field that may request, for example, up to eight CSI RSRQ measurements. As another example, the "NR-DL-TDOA-RequestLocationInformation" LPP IE, which is used to request DL-TDOA location measurements from a target UE, includes an "nr-RequestedMeasurements" field that may request, for example, up to eight PRS RSRP measurements. As yet another example, the "NR-Multi-RTT-RequestLocationInformation" LPP IE, which is used to request multi-RTT location measurements from a target UE, includes an "nr-RequestedMeasurements" field that may request, for example, up to eight PRS RSRP measurements.

Currently, a UE is expected to report one or more measurement instances (of RSTD, downlink RSRP, and/or UE Rx-Tx time difference measurements) in a single measurement report (e.g., in the LPP Provide Location Information message at stage 660) to the location server for UE-assisted positioning (there is no such reporting for UE-based positioning). A TRP is expected to report one or more measurement instances (of relative ToA (RTOA), uplink RSRP, and/or base station Tx-Rx time difference measurements) in a single measurement report to the location server (e.g., via NR positioning protocol type A (NRPPa)). Each measurement instance is reported with its own timestamp, and the measurement instances may be within a (configured) measurement window. Note that a measurement instance refers to one or more measurements, which can either be the same or different types, and which are obtained from the same DL-PRS resource(s) or the same SRS resource(s).

A UE is configured with a measurement period (also referred to as a "measurement window") during which it is expected to measure PRS. For example, the measurement period for PRS RSTD measurements in positioning frequency layer i, denoted $T_{PRS\text{-}RSTD,i}$, is specified below:

$$T_{PRS-RSTD,i} = \left(CSSF_{PRS,i} * N_{RxBeam,i} * \left\lceil \frac{N_{PRS,i}^{slot}}{N'} \right\rceil \left\lceil \frac{L_{PRS,i}}{N} \right\rceil * N_{sample} - 1\right) * T_{effect,i} + T_{last}$$

In the above equation:

$N_{RxBeam,i}$ is the UE receive beam sweeping factor. As examples, in FR1, $N_{RxBeam,i}=1$, and in FR2, $N_{RxBeam,i}=8$. Note that the more receive beams, the more PRS resources the UE will need;

$CSSF_{PRS,i}$ is the carrier-specific scaling factor (CSSF) for NR PRS-based based positioning measurements in frequency layer i;

$N_{sample}$ is the number of PRS RSTD measurement samples. As an example, $N_{sample}=4$;

$T_{last}$ is the measurement duration for the last PRS RSTD sample, including the sampling time and processing time, $T_{last}=T_i+L_{PRS,i}$;

$$- T_{effect,i} = \left\lceil \frac{T_i}{T_{available\_PRS,i}} \right\rceil * T_{available\_PRS,i};$$

$T_i$ corresponds to the "durationOfPRS-ProcessingSymbolsInEveryTms" LPP IE;

$T_{available\_PRS,i}=LCM(T_{PRS,i}, MGRP_i)$, the least common multiple between $T_{PRS,i}$ and $MGRP_i$;

$T_{PRS,i}$ is the periodicity of DL-PRS resource on frequency layer i;

$L_{PRS,i}$ is a time duration;

$$N_{PRS,i}^{slot}$$

is the maximum number of DL-PRS resources in positioning frequency layer i configured in a slot;

{N, T} is the UE capability combination per band, where N is a duration of DL-PRS symbols in milliseconds (ms) corresponding to the "durationOfPRS-Processing-Sysmbols" LPP IE processed every T ms corresponding to the "durationOfPRS-ProcessingSymbolsInEvery-Tms" LPP IE for a given maximum bandwidth supported by the UE corresponding to the "supported-BandwidthPRS" LPP IE; and N' is the UE capability for the number of DL-PRS resources that it can process in a slot as indicated by the "maxNumOfDL-PRS-ResProcessedPerSlot" LPP IE.

Note that while the foregoing is for PRS RSTD measurements, the same or similar equations and parameters are used for other types of measurements (e.g., Rx-Tx time difference measurements, RSRP measurements, etc.).

The following table provides the current physical layer DL-PRS processing capabilities a UE can report. These values indicate the amount of time the UE may need to buffer and process DL-PRS at the physical layer.

TABLE 2

| PRS Processing Capabilities | Values |
|---|---|
| Maximum number of PRS resources per slot the UE can process | 1, 2, 4, 6, 8, 12, 16, 24, 32, 48, 64 |
| Maximum duration of PRS symbols in milliseconds (ms) per T ms window the UE can buffer and process | N: {0.125, 0.25, 0.5, 1, 2, 4, 6, 8, 12, 16, 20, 25, 30, 32, 35, 40, 45, 50} ms<br>T: {8, 16, 20, 30, 40, 80, 160, 320, 640, 1280} ms |

The measurement period (or measurement window) for each positioning frequency layer depends on (1) the UE's reported capabilities (e.g., from Table 2), (2) the PRS periodicity ($T_{PRS}$ or T_PRS), (3) the measurement gap periodicity (a UE is not expected to measure PRS without a measurement gap in which to do so), and (4) the number of the UE's receive beams (if operating in FR2).

Figure 7:
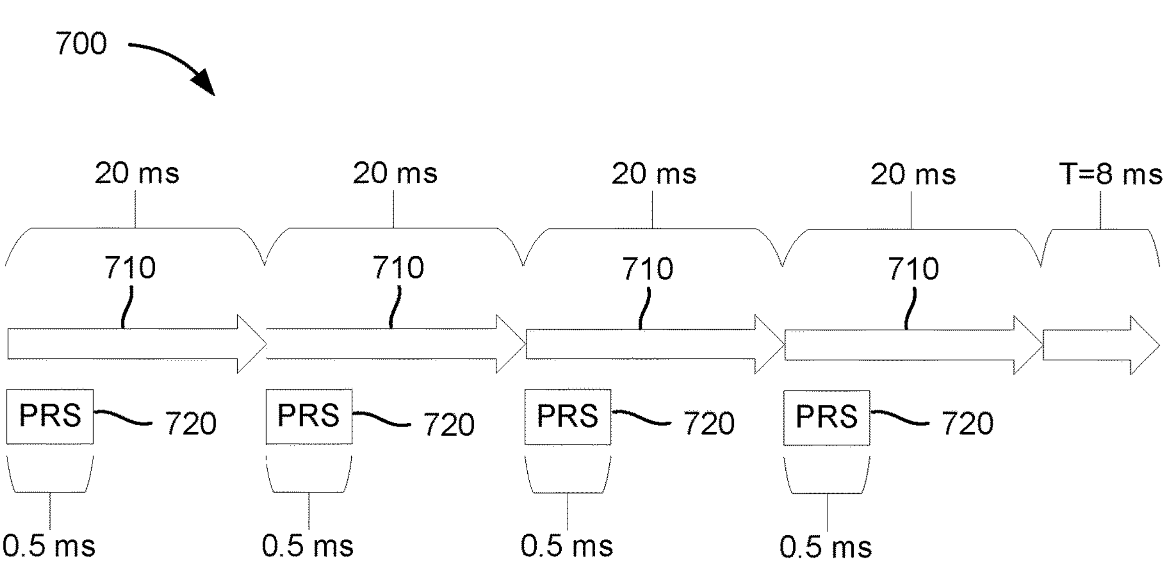
FIG. 7 is a diagram illustrating an example downlink PRS measurement scenario, according to aspects of the disclosure.

FIG. 7 is a diagram 700 illustrating an example DL-PRS measurement scenario, according to aspects of the disclosure. In FIG. 7, time is represented horizontally. The arrows represent a PRS periodicity 710 of 20 ms and the blocks represent PRS resources 720, within the PRS periodicities 710, having a duration of PRS symbols in milliseconds of 0.5 ms.

Based on the above considerations related to the length of the measurement window, the minimum DL-PRS measurement window in the example of FIG. 7 would be 88 ms, given the following assumptions: (1) one DL-PRS frequency layer in FR1, (2) DL-PRS RSTD measurements are performed across four DL-PRS instances (i.e., four repetitions of the PRS periodicity 710), (3) both the PRS periodicity 710 and the measurement gap periodicity (denoted "measurement gap repetition period," or "MGRP") are equal to 20 ms, and (4) the configured PRS resources are within the UE's PRS processing capacity. For the fourth assumption, the parameter (N, T)=(0.5 ms, 8 ms) (from Table 2), where N is the duration of the PRS resources 720 in milliseconds that the UE can process every T=8 ms. Thus, after the last PRS periodicity 710, there is an 8 ms period (i.e., T) during which the UE processes the PRS resources 720 received during the four PRS periodicities 710, resulting in a total latency of 88 ms.

Figure 8:
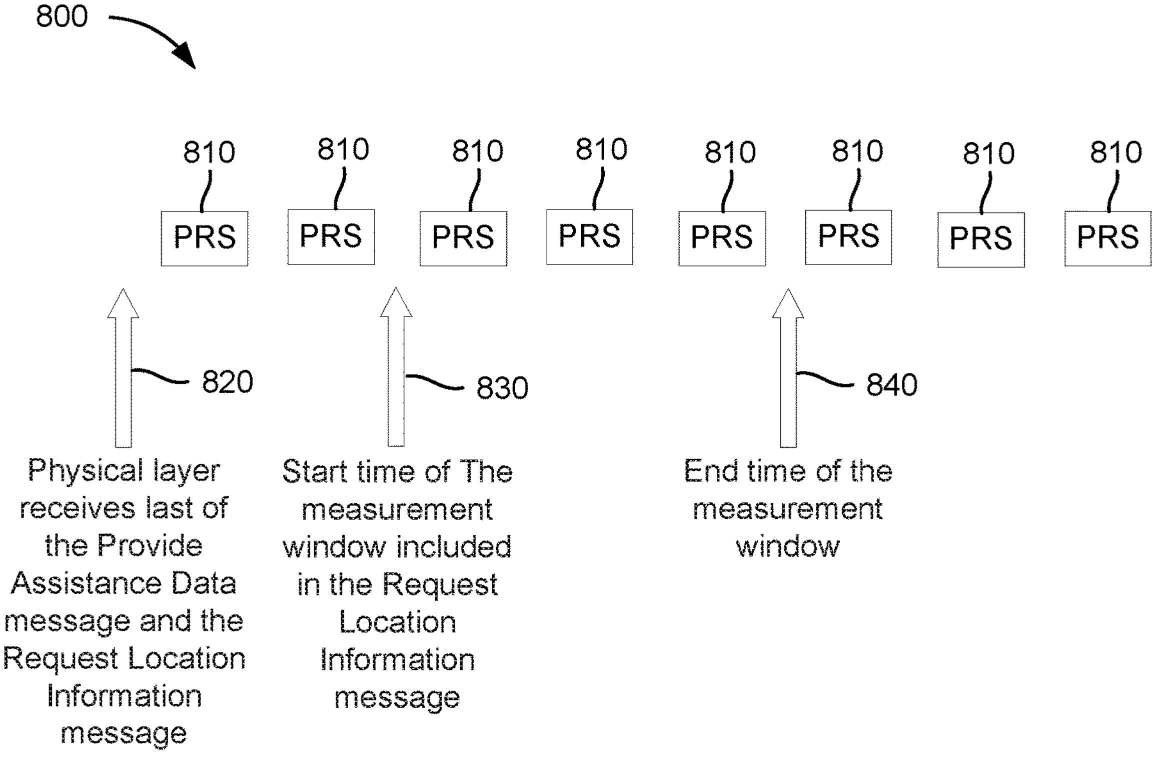
FIG. 8 is a diagram illustrating an example determination of a downlink PRS measurement window, according to aspects of the disclosure.

FIG. 8 is a diagram 800 illustrating an example determination of a DL-PRS measurement window, according to aspects of the disclosure. In FIG. 8, time is represented horizontally, and each block represents a PRS resource 810 having some duration of PRS symbols in milliseconds (i.e., N from Table 2). The PRS periodicity may be the time from the start of one PRS resource 810 to the start of the next PRS resource 810.

As shown in FIG. 8, the UE's physical layer receives the last portion of an assistance data message (e.g., the LPP Provide Assistance Data message at stage 630) and a request location information message (e.g., the LPP Request Location Information message at stage 640) at the time indicated by arrow 820. The UE may receive these messages from the location server via LPP. In response, the UE is expected to perform multiple (up to the UE capability) positioning measurements (e.g., Rx-Tx time difference, ToA, RSTD, etc.) in the configured positioning frequency layer(s) within the configured measurement window. The measurement window starts at the first measurement gap instance aligned with the PRS resources of the positioning frequency layer i closest in time after both the assistance data message and the request location information message are received at the physical layer of the UE, represented by arrow 830. The end of the measurement window is represented by arrow 840.

For positioning procedures in which low latency is required (e.g., less than 10 ms at the physical layer), an 88 ms measurement window (as in the example of FIG. 7) at the physical layer will not suffice. In addition, there are expected to be new measurement and reporting quantities for NR positioning sessions in the future, such as Doppler spread/shift, speed, and/or velocity vector (i.e., directions of movement). It is also expected that there will be low-latency reporting requirements and batch reporting requirements. These expectations raise the issue of how the measurement window will change to accommodate these expectations.

The present disclosure provides techniques to formulate the measurement window. The start of the measurement period may depend on whether the request location information message includes a request to measure within a specific measurement window. For example, a "startMeasurementTime" parameter may be added to the request location information message and may be used, in addition to the time of the first measurement gap instance aligned with the PRS resources of the positioning frequency layer i closest in time after both the assistance data message and the request location information message are received at the physical layer of the UE, to determine the measurement period. That is, the start of the measurement window would depend on four factors instead of three, as currently. Specifically, the start of the measurement window would start at (1) the first measurement gap instance aligned with DL-PRS resources of positioning frequency layer i closest in time after (2) the provide assistance data message and (3) the request location information message are received at the physical layer of the UE and (4) after the "startMeasurementTime" indicated in the request location information message. The "startMeasurementTime" may align with the first measurement gap instance aligned with DL-PRS resources of positioning frequency layer i closest in time after the provide assistance data and request location information messages are received, but it may also be later in time.

For example, for a multi-RTT positioning procedure, the time $T_{UERxTx,i}$ (the measurement window for a UE Rx-Tx time difference measurement) may start from the first measurement gap instance aligned with DL-PRS resources of the positioning frequency layer i closest in time after the "NR-Multi-RTT-RequestLocationInformation" message and the "NR-Multi-RTT-ProvideAssistanceData" message are received at the physical layer of the UE from the LMF via LPP, and after the "startMeasurementTime" indicated in the "NR-Multi-RTT-RequestLocationInformation" message.

When a request to measure within a specific measurement window or within specific PRS instances is received, the number of measurement samples ($N_{sample}$) that need to be available within the measurement window for deriving positioning measurements that satisfy a first accuracy level is given by:

$$CSSF_i * N_{RxBeam,i} * \left\lceil \frac{N_{PRS,i}^{slot}}{N'} \right\rceil \left\lceil \frac{L_{PRS,i}}{N} \right\rceil * N_{sample}$$

where $N_{sample}$ may be configured to the UE and can be associated with the chosen "accuracy level." Currently, $N_{sample}$ is defined as '4.' Note that $N_{sample}<N_{threshold}$ may correspond to the case that no accuracy requirements are expected to be met (which is a possible accuracy level). In addition, at least $N_{sample}=1$ may correspond to a different accuracy level than the current accuracy level for $N_{sample}=4$.

If there are fewer measurement samples within the measurement window than are needed to meet the accuracy requirement, then there are different options the UE can follow. As a first option, it may be that no accuracy requirements is expected to be met. As another option, it may be that the UE is expected to meet a second, more relaxed, accuracy requirement. This may include a signal-to-noise ratio (SNR) side condition to meet the more relaxed accuracy requirement. For example, if the UE samples only one sample, then the UE will meet the more relaxed accuracy requirement if the SNR of that sample is larger than 'X1' decibels (dB), whereas in the legacy scenario, the SNR threshold is at 'Y1' dB, where 'Y1' is less than 'X1.' An example of 'Y1' is −6 or −3 dB for the serving cell and −10 or −13 dB for neighboring cells, whereas 'X1' may be 0 dB for the serving cell and −6 dB for neighboring cells.

As another option, if the UE samples only one sample (or some other number of samples that are to few to meet the accuracy requirement), then the accuracy requirement is at 'X' nanoseconds (ns), whereas if the UE samples the legacy number of samples, the accuracy requirement is at 'Y' ns, where 'Y' is less than 'X.' As yet another option, the previous two options may be combined. In this case, the UE would be expected to meet the accuracy requirement of 'X' ns only if the SNR is higher than 0 dB if there is a single sample measured (compared to the case that in the legacy scenario, an accuracy requirement of 'Y' ns should be met if the SNR is higher than −6 dB).

Figure 9:
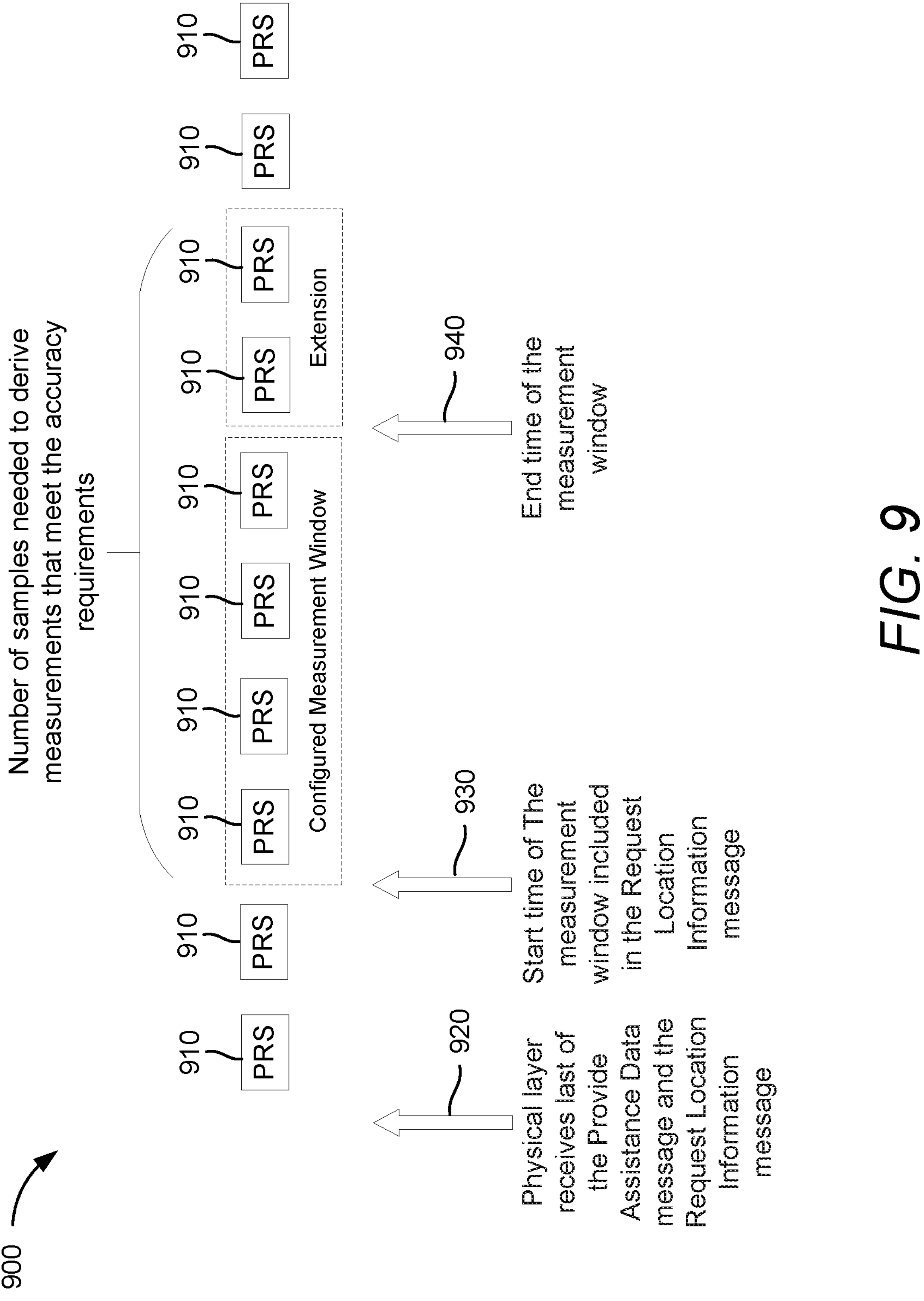
FIG. 9 is a diagram illustrating an example determination of a downlink PRS measurement window, according to aspects of the disclosure.

As yet another option, the measurement window may be extended and the UE may report measurements outside the configured measurement window, as illustrated in FIG. 9. FIG. 9 is a diagram 900 illustrating an example determination of a DL-PRS measurement window, according to aspects of the disclosure. In FIG. 9, time is represented horizontally, and each block represents a PRS resource 910 having some duration of PRS symbols in milliseconds (i.e., N from Table 2). The PRS periodicity may be the time from the start of one PRS resource 910 to the start of the next PRS resource 910.

As in FIG. 8, in FIG. 9, the UE's physical layer receives the last portion of an assistance data message (e.g., the LPP Provide Assistance Data message at stage 630) and a request location information message (e.g., the LPP Request Location Information message at stage 640) at the time indicated by arrow 920. The UE may receive these messages from the location server via LPP. In response, the UE is expected to perform multiple (up to the UE capability) positioning measurements (e.g., Rx-Tx time difference, ToA, RSTD, etc.) in the configured positioning frequency layers within the configured measurement window. The measurement window starts from the first measurement gap instance aligned with the PRS resources of the positioning frequency layer i closest in time after both the assistance data message and the request location information message are received at the physical layer of the UE, represented by arrow 930. The end of the measurement window is represented by arrow 940.

As shown in FIG. 9, the measurement window includes four PRS resources 910.

However, in the example of FIG. 9, six measurement samples are needed to derive measurements that meet the accuracy requirement of the positioning session. That is, the UE needs to measure six PRS resources 910 within the measurement window to derive measurements that meet the accuracy requirement. Accordingly, following the second option above, the UE can extend the measurement window in order to measure two additional PRS resources 910 (i.e., gather two additional measurement samples). The UE can then report all measurements that are within the extended measurement window, rather than only measurements within the configured measurement window.

Referring to CSSF in greater detail, when one or more measurement objects are monitored within measurement gaps, the CSSF for a target measurement object with index i is designated as $CSSF_{within\_gap,i}$. If measurement object i refers to a long-periodicity measurement that is any of (1) an evolved UMTS (universal mobile telecommunications system) terrestrial radio access (E-UTRA) RSTD measurement with periodicity $T_{PRS}$ (T_PRS from FIG. 5) greater than 160 ms or with periodicity TpRs equal to 160 ms but the parameter "prs-Mutinglnfo-r9" is configured, or (2) an NR measurement for positioning, then $CSSF_{within\_gap,i}=1$. Otherwise, the $CSSF_{within\_gap,i}$ for other measurement objects (including E-UTRA RSTD measurement with periodicity Tprs=160 ms) participate in the gap competition. For each measurement gap j not used for a long-periodicity measurement, the total number of intra-frequency measurement objects and inter-frequency/inter-RAT measurement objects that are candidates to be measured within the gap j are counted. Generally, when the CSSF is set to '1,' the CSSF indicates that a UE is expected to prioritize PRS in a measurement gap. When set to greater than '1' (e.g., 2, 3, 4, 5, 10), the CSSF indicates that a UE is expected to prioritize mobility measurements (e.g., RRM measurements for handovers) over positioning measurements. When set to a value less than'1' (e.g., 0.5), the CSSF indicates that a UE is expected to split processing between PRS and RRM according to the ratio indicated by the value of the CSSF.

Accordingly, in an aspect, when $N_{sample}<N_{threshold}$, the UE should prioritize PRS processing over mobility measurements. That is, the CSSF should be considered to be '1' (if it is not) if $N_{sample}=1$. Similarly, when the location information request includes a specific measurement window, the UE should prioritize PRS processing over mobility measurements (i.e., the CSSF should be considered to be '1'). Alternatively, the location information request may include an information field indicating whether the UE should prioritize PRS processing over mobility measurements. That is, the CSSF set to a value of '1' would be signaled explicitly.

In an aspect, for FR2, when $N_{RxBeam,i}<N_{threshold}$ (the same threshold to which $N_{sample}$ is compared), the UE should prioritize PRS processing over mobility measurements. That is, CSSF should be considered to be '1' (if it is not) if $N_{RxBeam,i}=1$. Similarly, in FR2, when the location information request includes a specific measurement window, the UE should prioritize PRS processing over mobility measurements. Alternatively, the location information request may include an information field indicating the value of $N_{RxBeam,i}$ that the UE should use. For example, $N_{RxBeam,i}=1$ when there is a specific measurement window). This is because if the number of different receive beams that will be measured is small (e.g., $N_{RxBeam,i}=1$), then these measurements should be prioritized over the mobility measurements, otherwise, there is a risk of not measuring any of the beams.

In an aspect, the measurement period may depend on whether the measurement report includes Doppler and/or velocity measurements or only time-based (e.g., ToA, RSTD, Rx-Tx time difference, etc.) and/or signal strength-based (e.g., RSRP, RSRQ, etc.) measurements. For Doppler and velocity measurements, the UE may need multiple instances (more than for time-based and/or signal strength-based measurements only) to determine the final measurement quantity (i.e., result). For example, the minimum number of measurement samples ($N_{sample}$=4 currently) may depend on whether the measured and reported measurement quantity is for Doppler/velocity. There may therefore need to be a different UE capability for Doppler/velocity reporting as opposed to timing/signal strength only reporting.

FIG. 10 is a diagram 1000 illustrating the difference in processing power needed for different types of positioning measurements, according to aspects of the disclosure. In the example of FIG. 10, time is represented horizontally and relative processing power is represented vertically. Each block represents a measurement sample of a particular type of measurement. Specifically, the UE is configured to perform both Rx-Tx time difference measurements, illustrated by blocks 1010, and Doppler measurements, illustrated by blocks 1020, over at least six instances. That is, the UE is configured to measure (sample) a PRS resource at least six times, at least three times to perform an Rx-Tx time difference measurement and at least three times to perform a Doppler measurement.

As shown in FIG. 10, the amount of processing power required to perform the Rx-Tx time difference measurements is less than the processing power required to perform the Doppler measurements. For example, a UE may be able to process 'X' number of PRS resources within T ms for UE Rx-Tx time difference measurements (and other time/signal strength-based measurements) and 'Y' number of PRS resources within T ms for Doppler measurements (and other velocity-based measurements). The 'Y' number of PRS resources for Doppler measurements may also include the number of PRS resources needed for time/signal strength-based measurements. That is, the UE may be able to process PRS resources for both time/signal strength-based measurements and velocity-based measurements in the 'Y' number of PRS resources within T ms.

Different processing capabilities may be due to different processing implementations. For example, the time domain implementation for Doppler measurements will likely need more processing power compared to the frequency domain implementation for such measurements. This may be a differentiator for premium versus low cost devices.

In the example of FIG. 10, the needs some instances to measure and report the Rx-Tx time difference measurements and some instances to measure and report the Doppler measurements. As shown, the Doppler measurements need more processing power than the Rx-Tx time difference measurements. For example, assume X=10 and Y=5. That is, the UE may be able to process 10 PRS resources within T ms for the Rx-Tx time difference measurements and five PRS resources within T ms for the Doppler measurements, or for both Rx-Tx time difference and Doppler measurements.

Note that although FIG. 10 illustrates Rx-Tx time difference and Doppler measurements, as will be appreciated, they may be any type of time/signal strength-based and velocity measurements, respectively. In addition, although only six instances are shown, there may be more or fewer instances.

In an aspect, the PRS resources aligned with a measurement gap may be periodic or on-demand. One or more of the start measurement time parameters may indicate the periodicity of the PRS resources with respect to the start time of the measurement period. In this way, the UE may receive a request location information associated with periodic PRS resources, and the UE may then perform measurements periodically, using the periodicity from the start measurement time parameters, without receiving another request location information message.

Figure 11:
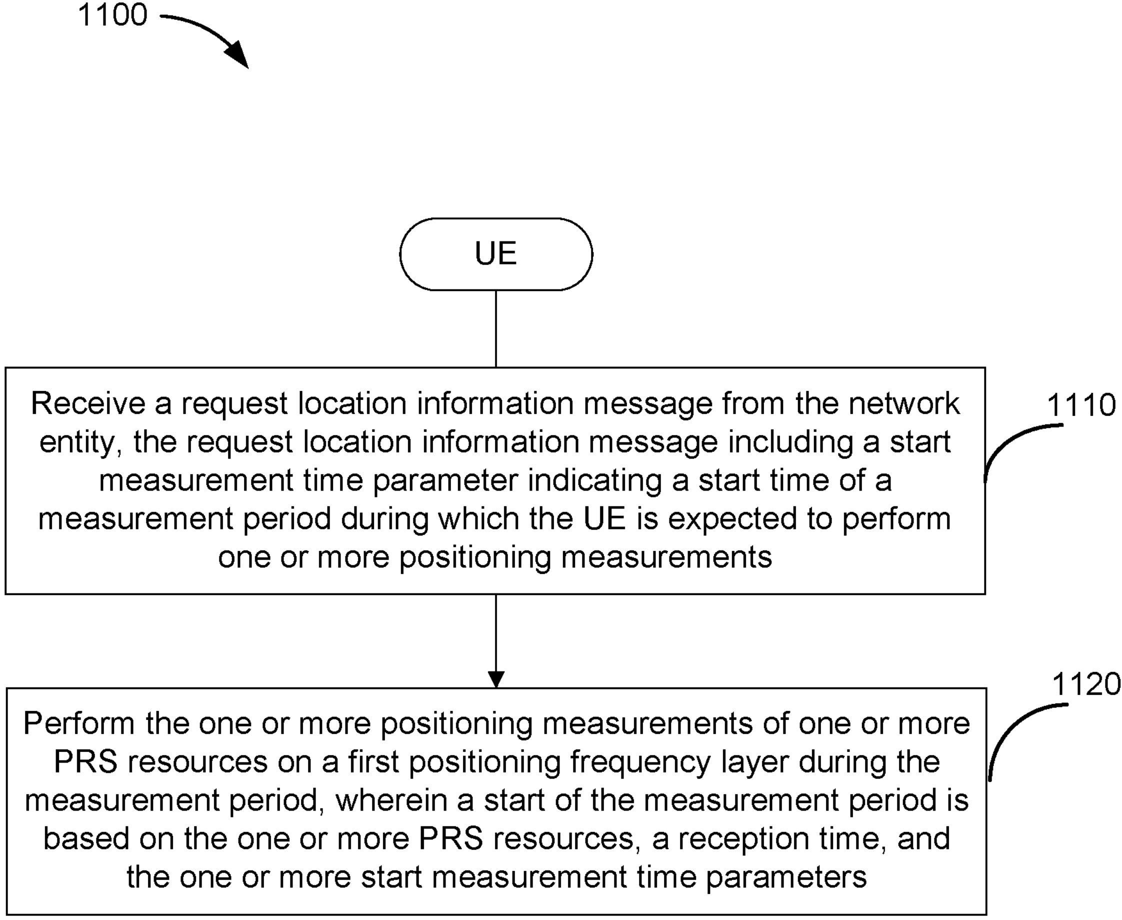
FIGS. 11 and 12 illustrate example methods of wireless positioning, according to aspects of the disclosure.

FIG. 11 illustrates an example method 1100 of wireless positioning, according to aspects of the disclosure. In an aspect, method 1100 may be performed by a UE (e.g., any of the UEs described herein).

At 1110, the UE receives a request location information message (e.g., the LPP Request Location Information message at stage 640) from the network entity, the request location information message including one or more start measurement time parameters indicating a start time of a measurement period (or measurement window) during which the UE is expected to perform one or more positioning measurements (e.g., Rx-Tx time difference, RSTD, RSRP, etc.). In an aspect, operation 1110 may be performed by WWAN transceiver 310, processing system 332, memory component 340, and/or positioning component 342, any or all of which may be considered means for performing this operation.

At 1120, the UE performs the one or more positioning measurements of one or more PRS resources on a first positioning frequency layer during the measurement period, wherein a start of the measurement period is based on the one or more PRS resources, a reception time, and the one or more start measurement time parameters. In an aspect, operation 1120 may be performed by WWAN transceiver 310, processing system 332, memory component 340, and/or positioning component 342, any or all of which may be considered means for performing this operation.

Figure 12:
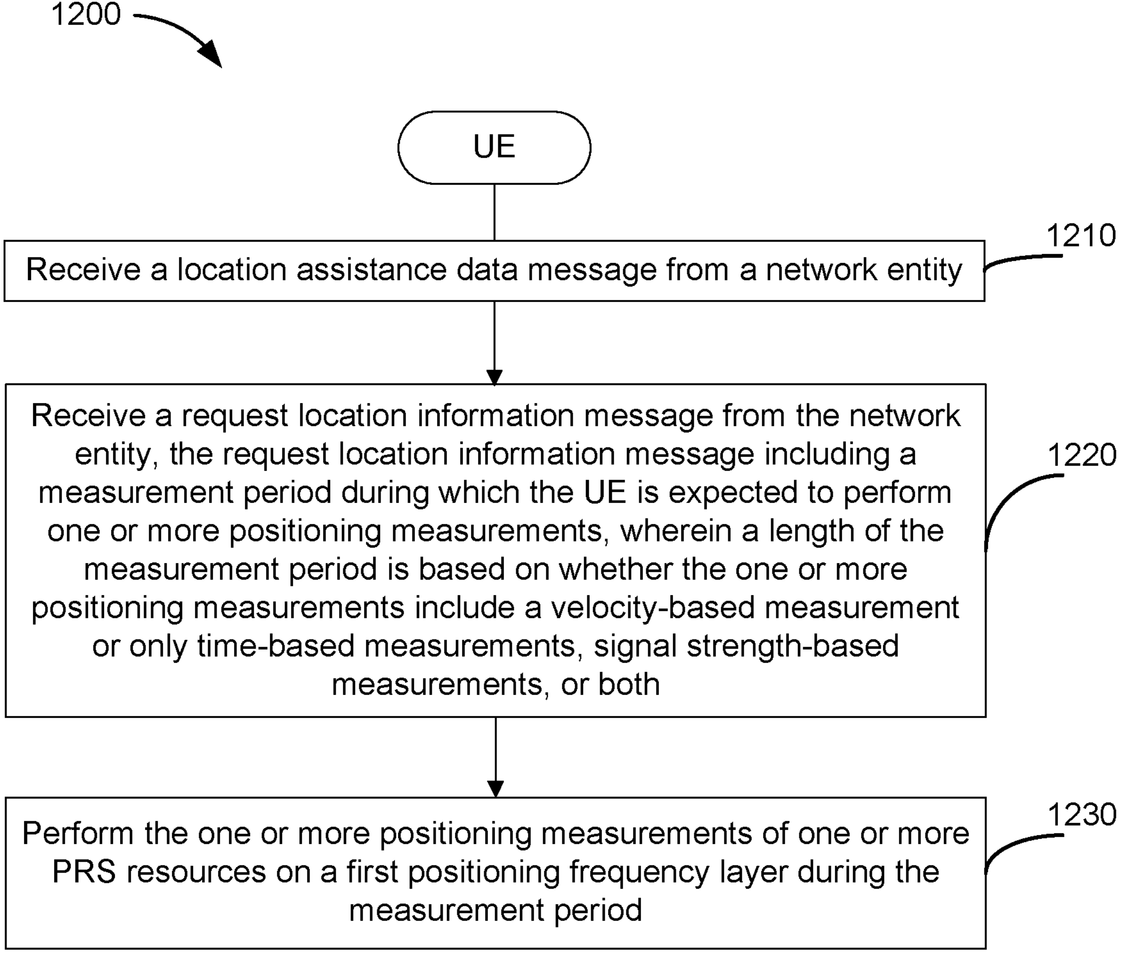

FIG. 12 illustrates an example method 1200 of wireless positioning, according to aspects of the disclosure. In an aspect, method 1200 may be performed by a UE (e.g., any of the UEs described herein).

At 1210, the UE receives a location assistance data message (e.g., the LPP Provide Assistance Data message at stage 630) from a network entity (e.g., a location server, the UE's serving base station). In an aspect, operation 1210 may be performed by WWAN transceiver 310, processing system 332, memory component 340, and/or positioning component 342, any or all of which may be considered means for performing this operation.

At 1220, the UE receives a request location information message (e.g., the LPP Request Location Information message at stage 640) from the network entity, the request location information message including a measurement period during which the UE is expected to perform one or more positioning measurements, wherein a length of the measurement period is based on whether the one or more positioning measurements include a velocity-based measurement (e.g., Doppler, velocity) or only time-based measurements, signal strength-based measurements, or both. In an aspect, operation 1220 may be performed by WWAN transceiver 310, processing system 332, memory component 340, and/or positioning component 342, any or all of which may be considered means for performing this operation.

At 1230, the UE performs the one or more positioning measurements of one or more PRS resources on a first positioning frequency layer during the measurement period. In an aspect, operation 1230 may be performed by WWAN transceiver 310, processing system 332, memory component 340, and/or positioning component 342, any or all of which may be considered means for performing this operation.

As will be appreciated, a technical advantage of the methods 1100 and 1200 is increased flexibility for the measurement period, resulting in improved positioning performance. A technical advantage of the method 1200 is increased accuracy for velocity-based measurements.

Note that as used herein, the term "aligned" (e.g., in the context of a measurement gap aligned with one or more PRS resources) means that the one or more PRS resources occur within the measurement gap, but the first of the one or more PRS resources may not coincide with (e.g., occur on the same symbol as) the start of the measurement gap. For example, the measurement gap may start at time T1 and the one or more PRS resources may start at time T2, where time T2 is after time T1. In this case, the one or more p are simply a trigger.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of wireless positioning performed by a user equipment (UE), comprising: receiving a request location information message from the network entity, the request location information message including one or more start measurement time parameters indicating a start time of a measurement period during which the UE is expected to perform one or more positioning measurements; and performing the one or more positioning measurements of one or more positioning reference signal (PRS) resources on a first positioning frequency layer during the measurement period, wherein a start of the measurement period is based on the one or more PRS resources, a reception time, and the one or more start measurement time parameters.

Clause 2. The method of clause 1, wherein: the reception time comprises a physical layer reception time, at the UE, of the request location information message, and the start of the measurement period is based on a first measurement gap aligned with the one or more PRS resources, the reception time, and the one or more start measurement time parameters.

Clause 3: The method of clause 2, wherein the first measurement gap aligned with the one or more PRS resources is closest in time after reception, at the physical layer of the UE, of the request location information message, and after a value of the one or more start measurement time parameters.

Clause 4. The method of any of clauses 1 to 3, further comprising: receiving a configured number of measurement samples needed during the measurement period in order to meet a first accuracy requirement for the one or more positioning measurements.

Clause 5. The method of clause 4, wherein, based on the configured number of measurement samples being less than a threshold, the UE is not expected to meet the first accuracy requirement.

Clause 6. The method of clause 5, wherein, based on the configured number of measurement samples being less than the threshold, the UE is expected to meet a second accuracy requirement that is lower than the first accuracy requirement.

Clause 7. The method of clause 6, wherein the UE is expected to meet the second accuracy requirement based on a signal-to-noise ratio (SNR) of a number of measurement samples taken within the measurement period being greater than a threshold.

Clause 8. The method of clause 7, wherein the number of measurement samples taken within the measurement period is one.

Clause 9. The method of any of clauses 6 to 7, wherein a number of measurement samples taken within the measurement period is greater than one.

Clause 10. The method of any of clauses 4 to 9, wherein, based on a number of measurement samples within the measurement period being less than or equal to the configured number of measurement samples, the UE is not expected to meet the first accuracy requirement.

Clause 11. The method of any of clauses 4 to 9, wherein, based on a number of measurement samples within the measurement period being less than the configured number of measurement samples, the measurement period is extended to include the configured number of measurement samples.

Clause 12. The method of any of clauses 4 to 11, wherein, based on the configured number of measurement samples being less than a threshold, the UE is expected to prioritize PRS processing over mobility measurements.

Clause 13. The method of any of clauses 1 to 12, wherein, based on the request location information message including the one or more start measurement time parameters, the UE is expected to prioritize PRS processing over mobility measurements.

Clause 14. The method of any of clauses 1 to 13, wherein the request location information message includes a parameter indicating that the UE is expected to prioritize PRS processing over mobility measurements.

Clause 15. The method of any of clauses 1 to 14, wherein the UE performs the one or more positioning measurements of the one or more PRS resources using multiple receive beams.

Clause 16. The method of clause 15, wherein the UE is operating in a millimeter wave (mmW) frequency range.

Clause 17. The method of any of clauses 1 to 16, wherein, based on a number of receive beams of the UE being less than a threshold, the UE is expected to prioritize PRS processing over mobility measurements.

Clause 18. The method of any of clauses 1 to 17, wherein, based on the request location information message including the one or more start measurement time parameters, the UE uses only one receive beam.

Clause 19. The method of any of clauses 1 to 18, wherein the request location information message includes a parameter indicating a number of receive beams of the UE.

Clause 20. The method of any of clauses 1 to 19, further comprising: reporting the one or more positioning measurements to the network entity.

Clause 21. The method of any of clauses 1 to 20, wherein: the network entity is a location server, and the request location information message is a Long-Term Evolution (LTE) positioning protocol (LPP) message.

Clause 22. The method of any of clauses 1 to 20, wherein: the network entity is a serving base station, and the request location information message is a radio resource control (RRC) message.

Clause 23. A method of wireless positioning performed by a user equipment (UE), comprising: receiving a location assistance data message from a network entity; receiving a request location information message from the network entity, the request location information message including a measurement period during which the UE is expected to perform one or more positioning measurements, wherein a length of the measurement period is based on whether the one or more positioning measurements include a velocity-based measurement or only time-based measurements, signal strength-based measurements, or both; and performing the one or more positioning measurements of one or more positioning reference signal (PRS) resources on a first positioning frequency layer during the measurement period.

Clause 24. The method of clause 23, wherein the one or more positioning measurements include at least the velocity-based measurement.

Clause 25. The method of any of clauses 23 to 24, wherein the velocity-based measurement comprises a Doppler measurement or a velocity measurement.

Clause 26. The method of any of clauses 23 to 25, wherein a minimum number of samples for the one or more positioning measurements is based on whether the one or more positioning measurements include the velocity-based measurement.

Clause 27. The method of any of clauses 23 to 26, further comprising: reporting a first PRS processing capability for time-based measurements, signal strength-based measurements, or both; and reporting a second PRS processing capability for velocity-based measurements.

Clause 28. The method of clause 27, wherein: the first PRS processing capability indicates a number of time-based measurements, signal strength-based measurements, or both that the UE can process in a given time period, and the second PRS processing capability indicates a number of velocity-based measurements that the UE can process in the given time period.

Clause 29. The method of clause 27, wherein the second PRS processing capability includes a capability of the UE to process time-based measurements, signal strength-based measurements, or both.

Clause 30. The method of any of clauses 23 to 29, further comprising: reporting the one or more positioning measurements to the network entity.

Clause 31. The method of any of clauses 23 to 30, wherein: the network entity is a location server, and the location assistance data message and the request location information message are Long-Term Evolution (LTE) positioning protocol (LPP) messages.

Clause 32. The method of any of clauses 23 to 30, wherein: the network entity is a serving base station, and the location assistance data message and the request location information message are radio resource control (RRC) messages.

Clause 33. A user equipment (UE) comprising a memory, at least one transceiver, and at least one processor communicatively coupled to the memory and the at least one transceiver, the at least one processor configured to perform a method in accordance with any of clauses 1 to 32.

Clause 34. A user equipment (UE) comprising means for performing a method in accordance with any of clauses 1 to 32.

Clause 35. A computer-readable medium storing computer-executable instructions, the computer-executable instructions comprising at least one instruction for causing a user equipment (UE) to perform a method in accordance with any of clauses 1 to 32.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless positioning performed by a user equipment (UE), comprising:

receiving a request location information message from a network entity, the request location information message including one or more parameters indicating a configured number of measurement samples needed during a measurement period during which the UE is expected to perform one or more positioning measurements, wherein the configured number of measurement samples taken within the measurement period is one; and performing the one or more positioning measurements of one or more positioning reference signal (PRS) resources on a first positioning frequency layer during the measurement period, wherein the measurement period is based on the one or more PRS resources and the configured number of measurement samples.

2. The method of claim 1, wherein:

the request location information message further includes one or more start measurement time parameters indicating a start time of the measurement period, and a start of the measurement period is based on the one or more PRS resources, a reception time, and the one or more start measurement time parameters.

3. The method of claim 2, wherein:

the reception time comprises a physical layer reception time, at the UE, of the request location information message, and the start of the measurement period is based on a first measurement gap aligned with the one or more PRS resources, the reception time, and the one or more start measurement time parameters.

4. The method of claim 3, wherein the first measurement gap aligned with the one or more PRS resources is closest in time after reception, at a physical layer of the UE, of the request location information message, and after a value of the one or more start measurement time parameters.

5. The method of claim 2, wherein, based on the request location information message including the one or more start measurement time parameters, the UE is expected to prioritize PRS processing over mobility measurements.

6. The method of claim 2, wherein, based on the request location information message including the one or more start measurement time parameters, the UE uses only one receive beam.

7. The method of claim 1, wherein:

the configured number of measurement samples is needed during the measurement period in order to meet a first accuracy requirement for the one or more positioning measurements.

8. The method of claim 7, wherein, based on the configured number of measurement samples being less than a threshold, the UE is not expected to meet the first accuracy requirement.

9. The method of claim 8, wherein, based on the configured number of measurement samples being less than the threshold, the UE is expected to meet a second accuracy requirement that is lower than the first accuracy requirement.

10. The method of claim 9, wherein the UE is expected to meet the second accuracy requirement based on a signal-to-noise ratio (SNR) of a number of measurement samples taken within the measurement period being greater than a threshold.

11. The method of claim 7, wherein the configured number of measurement samples taken within the measurement period is greater than one.

12. The method of claim 7, wherein, based on a number of measurement samples within the measurement period being less than or equal to the configured number of measurement samples, the UE is not expected to meet the first accuracy requirement.

13. The method of claim 7, wherein, based on a number of measurement samples within the measurement period being less than the configured number of measurement samples, the measurement period is extended to include the configured number of measurement samples.

14. The method of claim 7, wherein, based on the configured number of measurement samples being less than a threshold, the UE is expected to prioritize PRS processing over mobility measurements.

15. The method of claim 1, wherein the request location information message includes a parameter indicating that the UE is expected to prioritize PRS processing over mobility measurements.

16. The method of claim 1, wherein the UE performs the one or more positioning measurements of the one or more PRS resources using multiple receive beams.

17. The method of claim 16, wherein the UE is operating in a millimeter wave (mmW) frequency range.

18. The method of claim 1, wherein, based on a number of receive beams of the UE being less than a threshold, the UE is expected to prioritize PRS processing over mobility measurements.

19. The method of claim 1, wherein the request location information message includes a parameter indicating a number of receive beams of the UE.

20. The method of claim 1, further comprising:

reporting the one or more positioning measurements to the network entity.

21. The method of claim 1, wherein:

the network entity is a location server, and the request location information message is a Long-Term Evolution (LTE) positioning protocol (LPP) message.

22. The method of claim 1, wherein:

the network entity is a serving base station, and the request location information message is a radio resource control (RRC) message.

23. A user equipment (UE), comprising:

a memory;

a communication interface; and at least one processor communicatively coupled to the memory and the communication interface, the at least one processor configured to:

receive, via the communication interface, a request location information message from a network entity, the request location information message including one or more parameters indicating a configured number of measurement samples needed during a measurement period during which the UE is expected to perform one or more positioning measurements, wherein the configured number of measurement samples taken within the measurement period is one; and perform the one or more positioning measurements of one or more positioning reference signal (PRS) resources on a first positioning frequency layer during the measurement period, wherein the measurement period is based on the one or more PRS resources and the configured number of measurement samples.

* * * * *